(12) United States Patent
Munnik et al.

(10) Patent No.: US 11,709,685 B2
(45) Date of Patent: Jul. 25, 2023

(54) SYSTEM AND METHOD FOR LEVERAGING A PERSISTENT ENHANCED NOTIFICATION VIA A SOFTWARE DEVELOPMENT KIT

(71) Applicant: Plus44 Holdings Limited, Birmingham (GB)

(72) Inventors: Corbyn Munnik, Birmingham (GB); Frankie Kearney, Birmingham (GB); Samuel Barker, Birmingham (GB)

(73) Assignee: PLUS44 HOLDINGS LIMITED, London (GB)

( * ) Notice: Subject to any disclaimer, the term of this patent is extended or adjusted under 35 U.S.C. 154(b) by 0 days.

(21) Appl. No.: 17/735,876

(22) Filed: May 3, 2022

(65) Prior Publication Data
US 2022/0357957 A1    Nov. 10, 2022

Related U.S. Application Data

(60) Provisional application No. 63/186,676, filed on May 10, 2021, provisional application No. 63/186,674, filed on May 10, 2021.

(51) Int. Cl.
*G06F 9/445*       (2018.01)
*G06F 16/9532*   (2019.01)
*G06F 16/9538*   (2019.01)
*G06F 3/0481*    (2022.01)
*G06F 9/54*        (2006.01)

(52) U.S. Cl.
CPC ............ *G06F 9/445* (2013.01); *G06F 3/0481* (2013.01); *G06F 9/542* (2013.01); *G06F 16/9532* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 9,203,914 B1 | 12/2015 | Farago | |
| 9,830,611 B1 * | 11/2017 | Hamill | H04W 4/029 |
| 10,758,178 B2 * | 9/2020 | Wu | A61B 5/0064 |
| 10,798,252 B2 | 10/2020 | Raleigh | |
| 10,803,714 B1 * | 10/2020 | Khera | F21V 14/006 |
| 11,614,980 B2 | 3/2023 | Munnik et al. | |
| 2014/0201681 A1 | 7/2014 | Mahaffey et al. | |
| 2015/0188871 A1 | 7/2015 | Lewis et al. | |
| 2016/0154549 A1 * | 6/2016 | Chaudhri | H04L 51/224 715/825 |

(Continued)

OTHER PUBLICATIONS

U.S. Appl. No. 17/735,875 Office Action dated Aug. 15, 2022.

*Primary Examiner* — Ryan D. Coyer
(74) *Attorney, Agent, or Firm* — Polsinelli LLP

(57) ABSTRACT

The present invention is a system and user interface for a native toolbar that sits within a notification or control center of an operating system (OS) and looks native to the device. The native toolbar allows the user to see the notification at the top of their screen or display and is accessible prior to the user unlocking their device and through the notification center within the OS. The native toolbar provides access to frequently used applications, utility applications, a news feed as well as a search function by sending requests and receiving data from a platform that provides the native toolbar with data related to the device being used by the user to allow the native toolbar to appear native to the device.

20 Claims, 15 Drawing Sheets

(56) References Cited

U.S. PATENT DOCUMENTS

| | | | |
|---|---|---|---|
| 2017/0032264 A1* | 2/2017 | Liang | G06N 20/00 |
| 2017/0357975 A1 | 12/2017 | Moon et al. | |
| 2018/0109603 A1* | 4/2018 | Doumet | G06F 8/70 |
| 2019/0230467 A1 | 7/2019 | Williams et al. | |
| 2019/0260879 A1 | 8/2019 | Raleigh et al. | |
| 2020/0228642 A1* | 7/2020 | Choi | H04M 1/72472 |
| 2020/0228666 A1* | 7/2020 | Kendrick | G06Q 20/023 |
| 2020/0310707 A1* | 10/2020 | Sone | G06F 3/123 |
| 2021/0120128 A1 | 4/2021 | Raleigh et al. | |
| 2022/0358001 A1 | 11/2022 | Munnik | |

\* cited by examiner

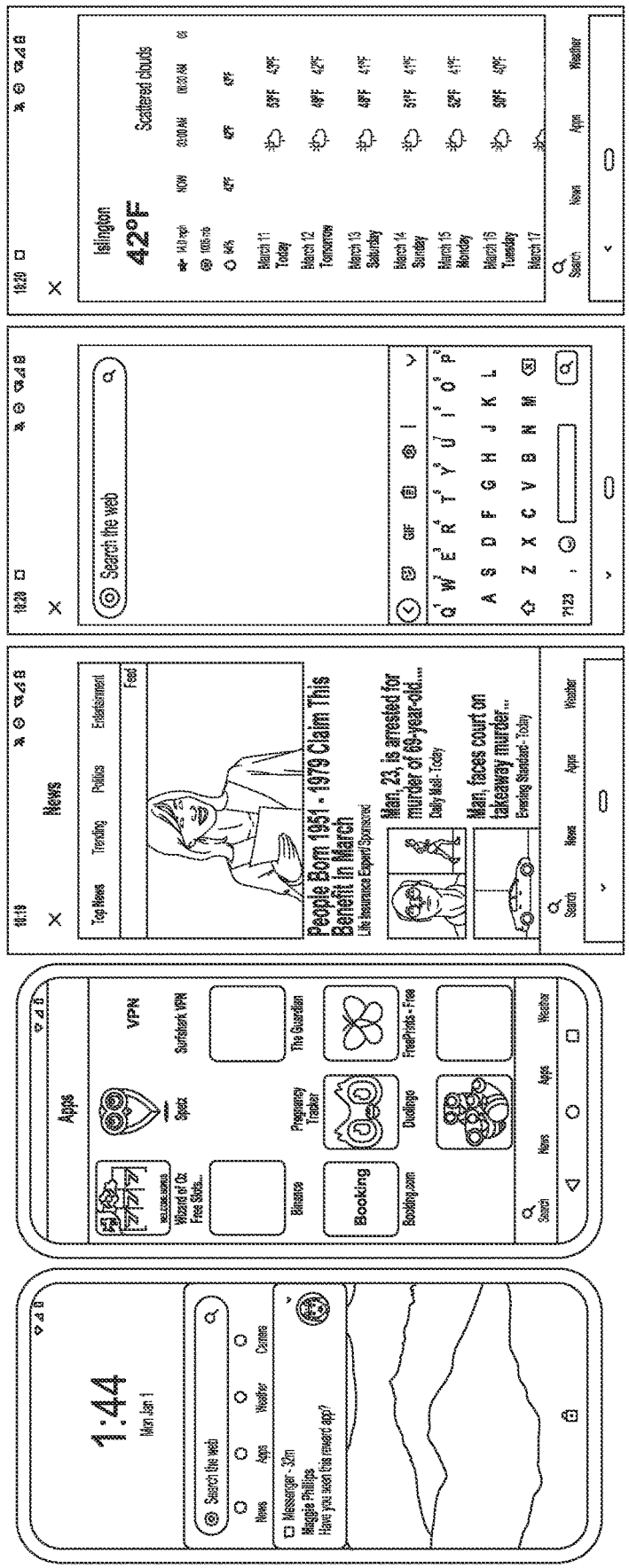

SYSTEM AND METHOD FOR LEVERAGING A PERSISTENT ENHANCED NOTIFICATION VIA A SOFTWARE DEVELOPMENT KIT

CROSS-REFERENCE TO RELATED APPLICATIONS

The present patent application claims the priority benefit of U.S. provisional patent application 63/186,674 filed on May 10, 2021, and U.S. provisional patent application 63/186,676 filed on May 10, 2021, disclosures of which are incorporated herein by references.

FIELD OF THE DISCLOSURE

The present disclosure is generally related to a system for providing a software development kit (SDK) that provides a persistent notification application in an onboarding process for another application. More specifically, the persistent notification application has enhanced functions providing frequently used applications, utility applications, a news feed, and/or a search function.

BACKGROUND

Application notifications are limited to the functions that the user can perform from the notification itself. Typically, the user is required to select the notification, which launches or initiates the application. Performing tasks directly from the notification is non-existent in today's mobile device applications. As such, notifications provided by mobile device applications are one-dimensional and provide only one function related to the mobile device application. These mobile device applications do not allow the user to take any actions other than launching or opening the application itself.

Thus, there is a need to allow users the ability to perform multiple functions of an application directly from the notification message.

SUMMARY OF THE CLAIMED INVENTION

Disclosed are systems, apparatuses, methods, computer readable medium, and circuits for integrating with a software development kit providing a persistent notification. According to at least one example, a method includes: providing a software development kit (SDK) that, when integrated with another application, presents a persistent notification application as a downloadable application at a client device that downloaded the other application; receiving a request from the client device to opt-in to download the downloadable persistent notification application; sending the downloadable persistent notification to the client device, wherein the downloadable persistent notification positions a notification with enhanced functions at the top of the user interface. For example, the client device provides a software development kit (SDK) that, when integrated with another application, presents a persistent notification application as a downloadable application at a client device that downloaded the other application; receives a request from the client device to opt-ins to download the downloadable persistent notification application; sends the downloadable persistent notification to the client device, wherein the downloadable persistent notification positions a notification with enhanced functions at the top of the user interface.

In another example, a client device for integrating with a software development kit providing a persistent notification is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the client device to: provide a software development kit (SDK) that, when integrated with another application, presents a persistent notification application as a downloadable application at a client device that downloaded the other application; receive a request from the client device to opt-in to download the downloadable persistent notification application; send the downloadable persistent notification to the client device, wherein the downloadable persistent notification positions a notification with enhanced functions at the top of the user interface.

DESCRIPTIONS OF THE DRAWINGS

FIGS. 11A-11I illustrate graphical user interfaces depicting an implementation of a native toolbar with enhanced functions in a notification in accordance with an embodiment;

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Embodiments of the present disclosure provide a persistent notification that includes enhanced features such as a search bar and frequently used utility applications. The persistent notification may be positioned at a top position of a notification center. Use data of the persistent notification may be tracked and sent to a analytics and monitoring module for determining monetization allocation.

Figure 1:
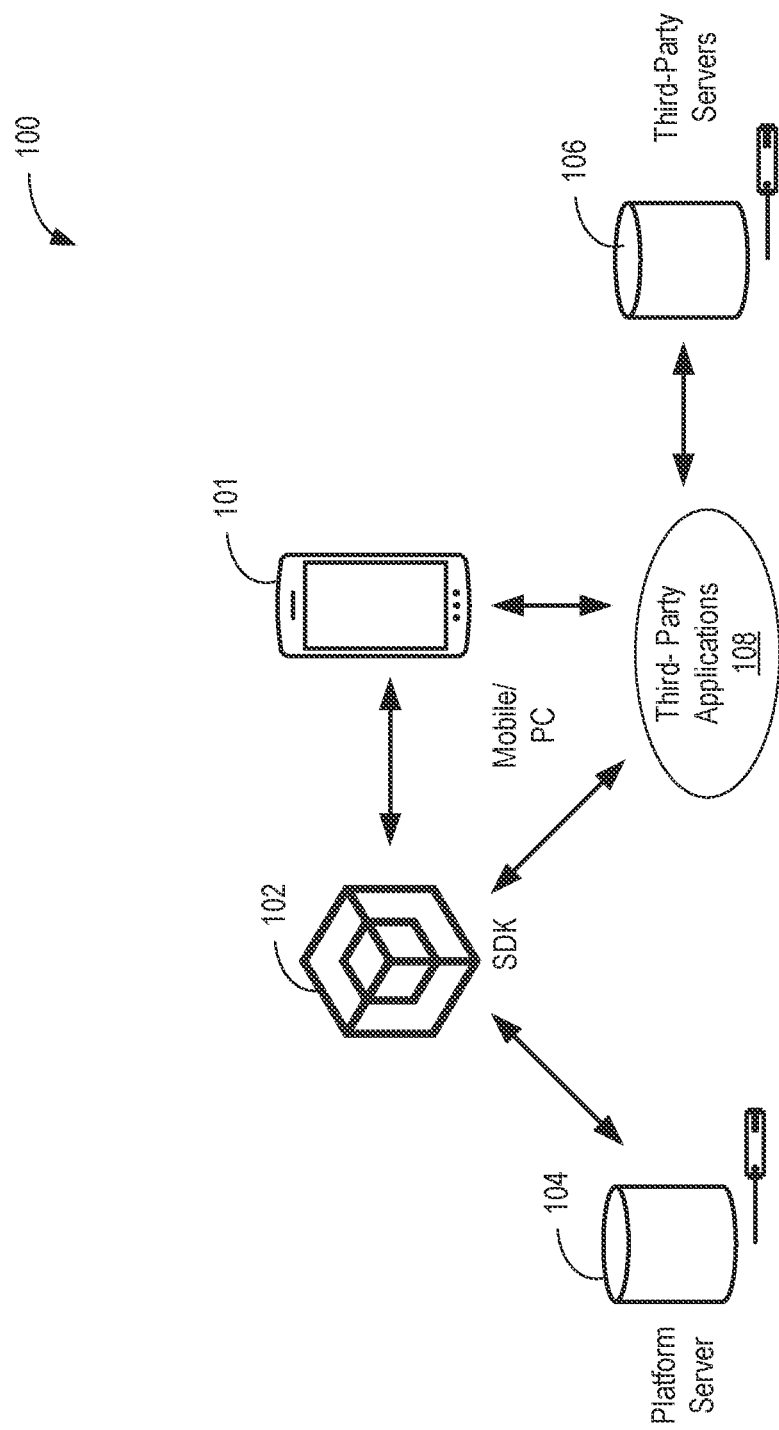
FIG. 1 illustrates an exemplary network environment in which an exemplary system for implementing a software development kit provides a native toolbar with enhanced functions in a notification in accordance with an embodiment.

FIG. 1 illustrates an exemplary network environment 100 in which an exemplary system for implementing a software development kit (SDK) for providing a native toolbar with enhanced functions in a notification in accordance with an embodiment. In some embodiments, an SDK 102 may be accessed through a platform server 104. In some embodiments, the SDK 102 may also be accessed via a cloud network, a storage device, or any kind of computer/CPU, processor or server that is capable of hosting the SDK 102. Developers for other applications hosted by other third-party servers 106 may integrate the SDK 102. The SDK 102 may be provided to the other applications as a monetization service, whereby the SDK runs monetization within a persistent notification on a device 101.

The SDK 102 may integrate with the other applications in a number of ways. In a non-limiting example, the integrated SDK 102 may allow uninterrupted use of the other application. In the present embodiment, third-party programming, computer code, or script of the other application may be accessed by the SDK 102 and a respective third-party server 106. In an alternate embodiment, platform server 104 may directly access or host the third-party programming or connect with the third-party server 106 to retrieve needed data.

In a non-limiting example, users interact through the third-party application 108 but are connected to the SDK 102 in the background. For example, by integrating the SDK 102, in some embodiments, a downloadable persistent notification application is presented in an onboarding process for the other applications. In another non-limiting example, a download option for the persistent notification application may be presented as an overlay at the client device after the other application is downloaded. The downloadable persistent notification application may be presented as an opt-in option and have an obvious opt-out option.

In the present embodiment, the SDK 102 may have a series of tools called listeners that may communicate with the third-party programming, computer code, or script and report results and data pertaining to actions at the persistent notification to the platform server 104. In another embodiment, the third-party servers 106 may report results to the SDK 102 or the platform server 104 when actions at the third-party application 108 trigger data retrieval or actions by the persistent notification.

In the present embodiment, the SDK 102 and the third-party servers 106 communicate in the backend to ensure that gaming quality and user experience remains fluid. In the present embodiment, the SDK 102 may have 'listeners' embedded throughout the software to monitor and report user interaction data, metrics, and trip actions that notify the SDK 102 or platform server 104 to perform a certain action.

Figure 2:
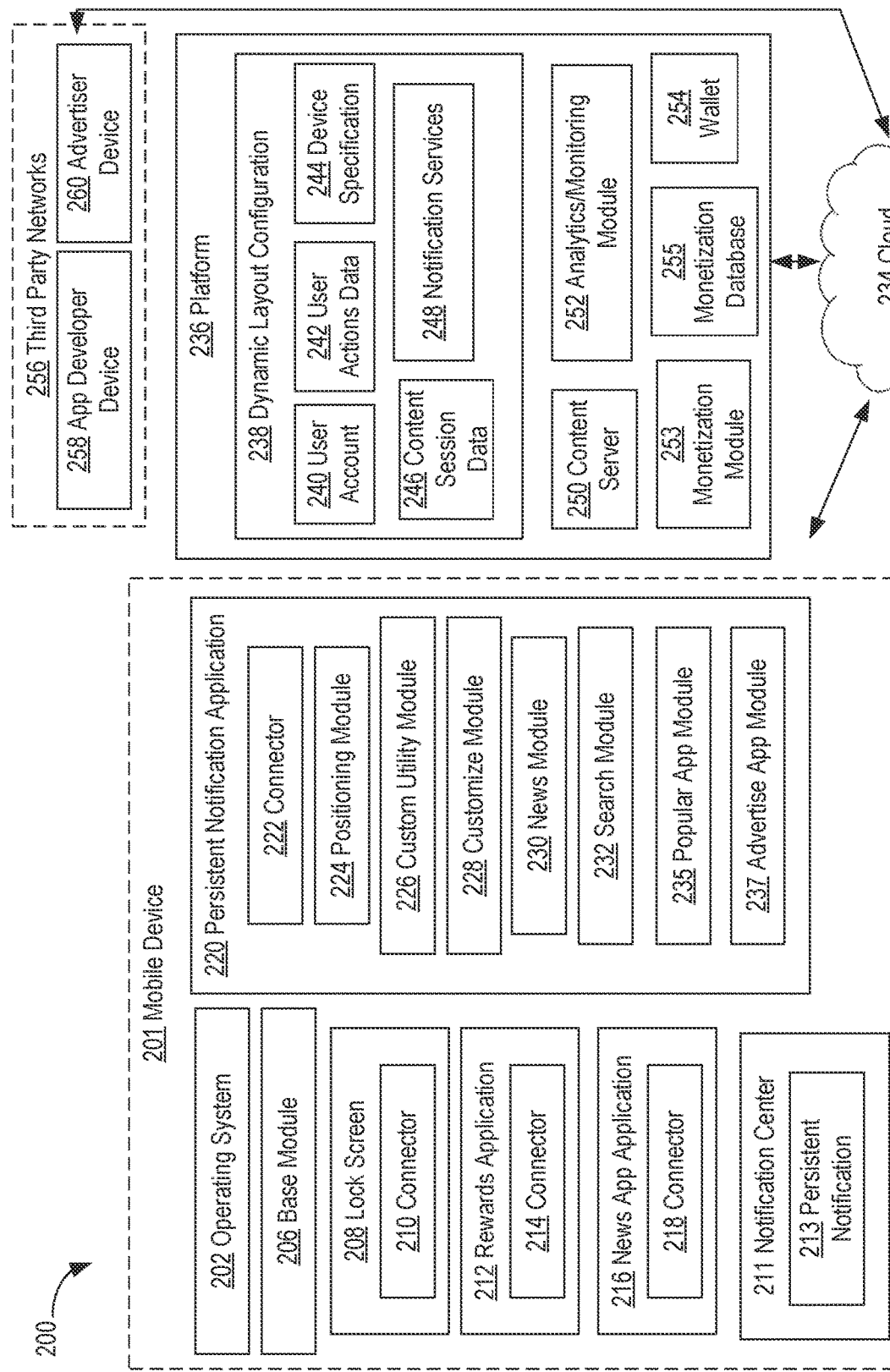
FIG. 2 illustrates the exemplary network environment for implementing the native toolbar with enhanced functions in a notification in accordance with an embodiment.

FIG. 2 illustrates the exemplary network environment for implementing the native toolbar with enhanced functions in a notification. The network environment 200 can be a network having a Mobile Device 201, a Platform 236, and Third-Party Networks 256 in communication with various other networks and devices via a Cloud Network 234 in accordance with an embodiment. This network environment 200 comprises the Mobile Device 201, such as a cellular device, smartphone, cell phone, etc., which may include an operating system (OS) 202 with preinstalled applications that appear native to in a graphical user interface of the Mobile Device 201, such as a Lock Screen 208, a Rewards Application 212, a News App Application 216, and an Persistent Notification 220, which provide ease of use and additional functionality to a user. In some embodiments, the Mobile Device 201 may be a smartphone such as an Android, iPhone, Windows Phone, etc. The OS 202 for the Mobile Device 201 may include software that supports a smartphone's basic functions, such as scheduling tasks, executing applications, and controlling peripherals.

Mobile operating systems combine features of a personal computer operating system with other features useful for mobile or handheld use and usually include a wireless inbuilt modem and SIM tray for telephony and data connection. The Mobile Device 201, with mobile communications abilities (e.g., smartphones), may contain two mobile operating systems—the main user-facing software platform is supplemented by a second low-level proprietary real-time operating system that operates the radio and other hardware. A Base Module 206 may be initiated upon installation of an application for displaying a native toolbar with a plurality of functions within a persistent notification onto the mobile device 201 and continuously monitoring the user interface on the mobile device 201. Activity at the user interface may activate the base module 206, which may further initiate modules in a Persistent Notification 220, such as a Positioning Module 224, a Custom Utility Module 226, a Customize Module 228, a News Module 230, and a Search Module 232.

For example, once the user interface is activated on the Mobile Device 201, the Positioning Module 224 is initiated to position a persistent notification at the top of the display, interface, or screen, also known as "position one". The Custom Utility Module 226 may be initiated to determine which utility applications should be displayed on the notification, such as camera, flashlight, calculator, etc. The Customize Module 228 may be initiated to determine which applications should be displayed on the application such as applications that the user has downloaded and frequently uses such as a map or GPS application, social networking applications, messaging applications, etc. The News Module 230 may be activated in order to determine which news articles should be displayed on the notification via the News App Application 216, which may provide news articles of interest to the user, if the user does not select a news article then the News Module 230 returns to the Base Module 206.

The Search Module 232 may be initiated to allow the user to search the Internet through a 3rd Party such as Google, Bing, etc. A search bar may be provided in the persistent notification and the Search Module 232 may be initiated when the user selects the search function on the notification. A Lock Screen 208 may be an application preinstalled on the OS 202 that looks native to the mobile device's interface or in a manner similar to the user interface of the Mobile Device 201. The Lock Screen 208 may be the screen, display, or interface presented to a user prior to a user unlocking their phone through a pin code, password, or biometric security. An unlock function, such as a swipe, may be presented in a space or region within the lock screen 208. In addition, the Lock Screen 208 may present content, for example, a news feed or an advertisement.

The lock screen may have a Connector 210, to connect to the Platform 236 in order to send a request to the Device Specification 244 in order to retrieve the data on the device's specification, such as a screen or display size, in order to determine how the Lock Screen 208 should be displayed on the user device's screen, display or interface. A connector 210, which may be a URL connection, cloud connection, etc., to allow the lock screen 208 to connect to the Platform 236 to allow requests to be sent and data to be retrieved from a Dynamic Layout Configuration 238, a Content Server 250, an Analytics/Monitoring Module 252, or a Wallet 254 of the Platform 236.

A Rewards Application 212 may be a preinstalled application on the OS 202 to provide users with an opportunity to earn rewards, such as coins, points, or a monetary value, that can be exchanged for gift cards, vouchers, other physical gifts, minutes, or data for their cellular plans, etc. The Rewards Application 212 allows for rewards to be earned by the user by completing 3rd party surveys, downloading applications, etc. The user's coins, points, or a monetary value, may be stored in the Wallet 254 which tracks the user's coins, points, or monetary value and allows the coins, points, or monetary value to be exchanged for gift cards, vouchers, other physical gifts, minutes, or data for their cellular plans. This is offered through other 3rd parties different from the 3rd party that offered the survey, application download, etc., or maybe exchanged from 3rd parties that are partnered with the application. A Connector 214 which may be a URL connection, cloud connection, etc., to allow the Rewards Application 212 to connect to the Platform 236 to allow requests to be sent and retrieve data from the Dynamic Layout Configuration 238, the Content Server 250, the Analytics/Monitoring Module 252, or the Wallet 254.

The News App Application 216 may be an application preinstalled on the mobile device Operating System 202 that looks native to the Mobile Device's 201 interface or is displayed in a manner which is displayed in a similar manner to the user interface of the Mobile Device 201. The news app application 216 may be initiated through a notification on the Mobile Device 201, user interface in which the user is notified of a news article of interest and the user selects the article on the notification launching the application. The News App Application 216 may connect to the Platform 236 to request and receive data such as accessing a user account through the User Account 240. The actions of the user allow the viewing of selected news articles through the User Actions data 242.

The user may adjust their specifications such as choosing a display, screen or interface size through the Device Specification 244. The user may control the content that has been previously viewed or selected through the Content Session Data 246. The user may control receiving notifications from the Platform 236 through the Notification Services 248. The News App Application 216 may also receive content, such as news articles that are aggregated for the user through the Content Server 250, and the Analytics/Monitoring Module 252 may be used to determine articles of interest to the user, determine previously viewed articles by the user so those news articles will not be shown to the user again, determine when the user was last shown an advertisement so the user will not be overwhelmed with advertisements or only shown advertisements periodically.

The News App application 216 may be displayed as a section on a notification, either from the lock screen 208 or the Persistent Notification 220, and initiated when the user selects the news article to be brought to the news article through the News App Application 216. A connector 218 which may be a url connection, cloud connection, etc., to allow the news app application 216 to connect to the platform 236 to allow requests to be sent and retrieve data from the dynamic layout configuration 238, content server 250, analytics/monitoring module 252, or wallet 254.

The Analytics/Monitoring Module 252 may be used to determine articles of interest to the user. The Analytics/Monitoring Module 252 may be used to determine previously viewed articles by the user so those news articles will not be shown to the user again. The Analytics/Monitoring Module 252 may be used to determine when the user was last shown an advertisement, not to be overwhelmed with advertisements. The Analytics/Monitoring Module 252 may be used to determine what information to show via the popular app related to monetization. The Analytics/Monitoring Module 252 may determine the most popular advertisement to show in the popular app. The Analytics/Monitoring Module 252 may determine which is the best advertisement related to the popular app. The Analytics/Monitoring Module 252 may determine which advertisement to show during the best part of the day. The Analytics/Monitoring Module 252 may determine the best advertisement based upon the user's profile from the User Account 240. The Analytics/Monitoring Module 252 may determine the best advertisement that makes Platform 236 make the most money. The Analytics/Monitoring Module 252 may determine the best advertisement that makes the Platform 236 partners make the most money.

The Persistent Notification 220 may include applications frequently used by the user or prompt the user to download an application through the process described in the Popular Apps Module 235, which is initiated through the Base Module 206. The Persistent Notification 220 may provide advertisements or recommended applications to download through the process described in the Advertise App Module 237, which is initiated by the Base Module 206. Advertise App Module 237 may be used to determine at any point which of a list of popular apps to position in the lock screen position. Advertise App Module 237 may be used to determine how long a popular app remains in the lock screen position. Advertise App Module 237 may be used to determine the schedule of which popular apps will be in the lock screen position.

In some embodiments, the Search Module 232, Popular App Module 235, and the Advertise App Module 237 may have already been performed to allow the notification to include additional application functions. For example, providing the user the ability to search the Internet or web through the Search Module 232, the most frequently used applications by the user, for example, social networking, messaging applications, etc. through the Popular App Module 235, and providing the user with advertisements and recommended applications to download through the Advertise App Module 237, and the Positioning Module 224 returns to the Base Module 206. A Search Module 232 initiated by the Base Module 206 or the Search Module 232 may be initiated by activating the user interface such as turning on the display, activating the screen, or unlocking the device. This allows the user to search the Internet or web through 3rd Party search engines, for example, Google, Bing, etc., via the Content Server 250. The Search Module 232 determines if the user selected the search function on the notification provided by Platform 236. Suppose it is determined that the user selected the search function on the notification provided by Platform 236. The user inputs the search terms into the search bar within the notification in the application provided by Platform 236. The Search Module 232 sends the search terms to the Content Server 250, which sends the terms to a 3rd party search engine and receives the search results from the 3rd Party search engine, for example, Google, Bing, etc.

Then, the Search Module 232 receives the search results from the Content Server 250. In some embodiments, the search function on the notification provided by Platform 236 may launch or initiate a 3rd Party search engine application in which the Search Module 232 is continuously polling for the user to exit the application and would bring the user back to the original notification in which the search was prompted. The Search Module 232 displays the received search results from the Content Server 250 on the Mobile Device 201 user interface to allow the user to scroll through the 3rd Party search engine's search results to the Content Server 250. If it is determined that the user did not select the search function or if the user closes, ends, or terminates the notification's search function, then the Search Module 232 returns to the Base Module 206. The Popular App Module 235 is initiated by Base Module 206.

The Popular App Module 235 may also be initiated from the user activating the user interface, such as turning on the display, activating the screen, or unlocking the device. The Popular App Module 235 provides the most frequently used applications (as mentioned above, any other method or algorithm) on the notification displayed on the Mobile Device 201. The Popular App Module 235 sends a request for the User Actions Data 242, Content Session Data 246, and Notification Services 248 located on the Dynamic Dynamic Layout Configuration 238. The Popular App Module 235 is sending a request to Platform 236 for the most frequently used or previously selected applications that should appear on the notification to the user, such as social networking applications, messaging applications, etc. In some embodiments, the user may select which applications they desire to appear on the notification by selecting the applications through a list of available applications available on the device. The Popular App Module 235 receives the application data from the User Actions Data 242, Content Session Data 246, and Notification Services 248 to provide the user with the applications within the notification from the application provided by Platform 236 to allow the most frequently used applications to be launched directly from the notification. The Popular App Module 235 displays the most frequently used applications on the notification, allowing users to launch the applications directly from the received notification. The Popular App Module 235 returns to the Base Module 206.

An Advertise App Module 237 being initiated by the Base Module 206 or the Advertise App Module 237 may be initiated by activating the user interface such as turning on the display, activating the screen, or unlocking the device. This provides the most frequently used utility applications (as mentioned above, any other method or algorithm) on the notification displayed on the Mobile Device 201. The Advertise App Module 237 sends a request to the Content Server 250, Analytics/Monitoring Module 252, and Notification Services 248 located on the Dynamic Dynamic Layout Configuration 238.

The Advertise App Module 237 sends its data to the Monetization Module 253 of the Platform 236. This data sent to the Monetization Module 253 will be used to determine which parties get pay in or get paid. Parties can be but are not limited to the user, the Popular App being used, the advertiser, the platform, and even the owners of the mobile device operating system or mobile device manufacturer. The data associated with the Monetization Module 256 is stored in the Monetization Database 255. It should be obvious to those skilled in the art when and how payments are made using the Monetization Database 255.

The App Developer Devices 258 may provide their application to Platform 236, such as on the Content Server 250, to advertise their application on the Mobile Device's 102 notification to allow users to download or launch the application. The Advertisers Devices 260 may provide their advertisement content to Platform 236 and store their data on the Content Server 250. This allows users of Platform 236 to view the Advertisers Devices 260 advertisement. For example, an advertisement may be a notice or announcement in a public medium, such as the Platform's 236 notification, promoting a product, service, event, or publicizing a job vacancy. The Advertise App Module 237 sends a request to the Analytics/Monitoring Module 252. This request is used to determine how often a user is being sent notifications with an app or advertisement. This data is used to determine if a previously determined threshold has been reached to send the user an app a new advertisement.

This data is also used to determine if the user will be sent a new app or advertisement or a new app or advertisement sent to the user through the notification. The Advertise App Module 237 receives the application and advertisement data from the Content Server 250. The Analytics/Monitoring Module 252 and Notification Services 248 provide the user with an application and advertisement within the notification provided by Platform 236. This allows the user to view an application, which may a recommended application, suggesting to download an application, or application that the user currently has installed on the Mobile Device 201 that has an agreement, contract, or other types of engagement with the Platform 236, and an advertisement from a $3^{rd}$ Party. The Advertise App Module 237 displays the application and advertisement on the notification data provided by Platform 236. This allows the user to view a recommended application and an advertisement within the notification, and the Advertise App Module 237 then returns to the Base Module 206.

The cloud or communication network may be a wired and a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques are known in the art. The communication network may allow ubiquitous access to shared pools of configurable system resources and higher-level services that can be rapidly provisioned with minimal management effort, often over the Internet, and rely on sharing resources to achieve coherence economies of scale, like a public utility. At the same time, third-party clouds enable organizations to focus on their core businesses instead of expending resources on computer infrastructure and maintenance.

A Platform 236 receives requests from and sends data to the Lock Screen 108, the Rewards App 112, the News App 116, and the Action Toolbar 120. Platform 236 may contain a Dynamic Dynamic Layout Configuration 238. The Dynamic Dynamic Layout Configuration 238 contains data regarding (1) the user account, (2) user history, and (3) the user's Mobile Device 201 settings. The data also include content the user has viewed or accessed and the user's notification settings. Content Server 250 fetches content data from 3rd Party providers, an Analytics/Monitoring Module 252. This data contains an analysis of user's accounts such as content viewed or the number of times the application has accessed, or the number of times content has been viewed. Wallet 152 contains the user's transaction history for the Rewards App 112. Platform 236 may connect to the Mobile Device 201, the Lock Screen 108, the Rewards App 112, the News App 116, and the Action Toolbar 120 through a cloud connection, sim card, URL connection.

The Persistent Notification 220 may appear as a notification on the mobile device 201 interface, which sends a request to the Platform 236 to receive the Device Specification 244 to allow the notification to look native to the Mobile Device's 201 display, screen, or interface. The Persistent Notification 220 may be located at the top of the user interface through the process described in the Positioning Module 224 which is initiated through the Base Module 206.

The Persistent Notification 220 may include various utilities provided by the Mobile Device 201 such as flashlight, calculator, maps or GPS, Bluetooth settings, Wi-Fi settings, etc. through the process described in the Custom Utility Module 226 which is initiated through the Base Module 206. The Persistent Notification 220 may include applications frequently used by the user or prompt the user to download an application through the process described in the Customize Module 228 which is initiated through the Base Module 206. The Persistent Notification 220 may provide news articles of interest to the user through the process described in the News Module 230 which is initiated by the Base Module 206. The Persistent Notification 220 may provide the user the ability to search the internet or web through 3rd party search engines such as Google, Bing, etc. through the process described in the Search Module 232 which is initiated by the Base Module 206.

A Connector 222 which may be a URL connection, cloud connection, etc., to allow the Persistent Notification 220 to connect to the Platform 236 to allow requests to be sent and retrieve data from the Dynamic Layout Configuration 238, Content Server 250, Analytics/Monitoring module 252, or Wallet 254. A Positioning Module 224 which is initiated by the Base Module 206, or the Positioning Module 224 may be initiated from the user activating the user interface such as turning on the display, activating the screen, or unlocking the device. Then the Positioning Module 224 sends a request to the Platform 236 for the Device Specification 244 located on the Dynamic Layout Configuration 238.

For example, the Positioning Module 224 is sending a request for the specification data related to the device such as the manufacturer, model, size of the device, size of the screen or display, resolution of the device, etc. in order to display the notification in a manner and style similar to the device so the notification looks native to the device. Then the Positioning Module 224 receives the Device Specification 244 data to allow the notification to appear to be visually native to the device by using the specification data, for example, manufacturer, model, size of the device, size of the screen or display, resolution of the device, etc. Then the Positioning Module 224 displays the notification on the user interface of the Mobile device 201 at the top of the display screen or interface to allow the user to view the application as the first notification.

In some embodiments, the Custom Utility Module 226, Customize Module 228, News Module 230, and the Search Module 232 may have already been performed to allow the notification to include additional functions of the application, for example, the most frequently used utility applications, for example, the calculator, camera, maps or GPS, etc. through the Custom Utility Module 226, the most frequently used applications by the user, for example, social networking, messaging applications, etc. through the Customize Module 228, providing the user with a news feed through the News Module 230, and providing the user the ability to search the internet or web through the Search Module 232, and the Positioning Module 224 returns to the Base Module 206.

A Custom Utility Module 226 which is initiated by the Base Module 206, or the Custom Utility Module 226 may be initiated from the user activating the user interface such as turning on the display, activating the screen, or unlocking the device, to provide the most frequently used utility applications on the notification displayed on the Mobile device 201. Then the Custom Utility Module 226 sends a request for the User Actions Data 242 and Notifications services 248 located on the Dynamic Layout Configuration 238. For example, the Custom Utility Module 226 is sending a request to the Platform 236 for the most frequently used or previously selected utility applications that should appear on the notification to the user, for example, the camera, calculator, maps or GPS, etc. In some embodiments, the user may select which utility applications they desire to appear on the notification by selecting the applications through a list of available utility applications available on the device.

The Custom Utility Module 226 receives the utility application data from the User Actions Data 242 and Notifications services 248 to provide the user with the utility applications within the notification from the application provided by the Platform 236 to allow the utility applications to be launched directly from the notification. Then the Custom Utility Module 226 displays the most frequently used utility applications on the notification allowing a user to launch the utility applications directly from the received notification and the Custom Utility Module 226 returns to the Base Module 206. A Customize Module 228 which is initiated by the Base Module 206 or the Customize Module 228 may be initiated from the user activating the user interface such as turning on the display, activating the screen, or unlocking the device, to provide the most frequently used applications on the notification displayed on the Mobile device 201. Then the Customize Module 228 sends a request for the User Actions Data 242, Content Session Data 246, and Notifications services 248 located on the Dynamic Layout Configuration 238. For example, the Customize Module 228 is sending a request to the Platform 236 for the most frequently used or previously selected applications that should appear on the notification to the user, for example, the social networking applications, messaging applications, etc.

In some embodiments, the user may select which applications they desire to appear on the notification by selecting the applications through a list of available applications available on the device. In some embodiments, the applications that appear to the user may be recommended or advertised applications through 3rd Parties 256 that are sent to the Platform 236. The Customize Module 228 receives the application data from the User Actions Data 242, Content Session Data 246, and Notifications services 248 to provide the user with the applications within the notification from the application provided by the Platform 236 to allow the most frequently used applications to be launched directly from the notification. Then the Customize Module 228 displays the most frequently used applications on the notification allowing a user to launch the applications directly from the received notification and the Customize Module 228 returns to the Base Module 206.

A News Module 230 which is initiated by the Base Module 206 or the News Module 230 may be initiated from the user activating the user interface such as turning on the display, activating the screen, or unlocking the device, to provide the user with a news feed function on the notification. Then the News Module 230 determines if the user selected the News app application 216 on the notification. If it is determined that the user selected the News app application 216 on the notification then the News Module 230 launches the News app application 216. If it is determined that the user did not select the News app application 216 or if the user closes, ends, or terminates the News app application 216 the News Module 230 returns to the Base Module 206. A Search Module 232 which is initiated by the Base Module 206 or the Search Module 232 may be initiated from the user activating the user interface such as turning on the display, activating the screen, or unlocking the device, to provide the user the ability to search the internet or web through 3rd Party search engines, for example, Google, Bing, etc., via the Content Server 250.

Then the Search Module 232 determines if the user selected the search function on the notification provided by the Platform 236. If it is determined that the user selected the search function on the notification provided by the Platform 236, then the user inputs the search terms into the search bar within the notification in the application provided by the Platform 236. Then the Search Module 232 sends the search terms to the Content Server 250 which sends the terms to a 3rd party search engine and receives the search results from the 3rd Party search engine, for example, Google, Bing, etc. Then the Search Module 232 receives the search results from the Content Server 250. In some embodiments, the search function on the notification provided by the Platform 236 may launch or initiate a 3rd Party search engine application in which the Search Module 232 is continuously polling for the user to exit the application and would bring the user back to the original notification in which the search was prompted.

Then the Search Module 232 displays the received search results from the Content Server 250 on the Mobile device 201 user interface to allow the user to scroll through the search results that were provided by the 3rd Party search engine to the Content Server 250. If it is determined that the user did not select the search function or if the user closes, ends, or terminates the search function of the notification then the Search Module 232 returns to the Base Module 206. The cloud or communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet, and relies on sharing of resources to achieve coherence and economies of scale, like a public utility, while third-party clouds enable organizations to focus on their core businesses instead of expending resources on computer infrastructure and maintenance.

The Platform 236 receives requests from and sends data to the Lock Screen 208, the Rewards application 212, the News app application 216, and the Persistent Notification 220. The Platform 236 may contain a Dynamic Layout Configuration 238, which contains data on the user account, user history, user's Mobile device 201, content the user has viewed or accessed, and the user's notification settings, a Content Server 250 which fetches content data from 3rd Party providers, an Analytics/Monitoring module 252 which contains an analysis of user's accounts such as content viewed or the number of times the application has accessed or the number of times content has been viewed, and a Wallet 254 which contains the user's transaction history for the Rewards application 212. The Platform may connect to the Mobile device 201, the Lock Screen 208, the Rewards application 212, the News app application 216, and the Persistent Notification 220 through a cloud connection, sim card, URL connection.

A Dynamic Layout Configuration 238 contains the User Account 240, User Actions Data 242, Device Specification 244, Content Session Data 246, and Notification Services 248. The Dynamic Layout Configuration 238 receives requests from the applications on the Mobile device 201, such as the Lock Screen 208, the Rewards application 212, the News app application 216, and the Persistent Notification 220 and sends the request data back to the Mobile device 201 or applications, such as data related to the user, data related to the user's account, data related to the user's device, data related to the user's content or how the user receives notifications. A User Account 240 connects to the Lock Screen 208, the Rewards application 212, the News app application 216, and the Persistent Notification 220 through Connectors 210, 214, 218, 222, which may URL connections to allow the transmission of data. The User Account 240 may contain information or data related to the user's account within the applications. A User Actions Data 242 which connects to the Lock Screen 208, the Rewards application 212, the News app application 216, and the Persistent Notification 220 through Connectors 210, 214, 218, 222, which may URL connections to allow the transmission of data.

The User Actions Data 242 may be data related to the actions the user has performed on the applications, such as clicks, views, searches, etc. A Device Specification 244 connects to the Lock Screen 208, the Rewards application 212, the News app application 216, and the Persistent Notification 220 through Connectors 210, 214, 218, 222, which may URL connections to allow the transmission of data. The Device Specification 244 may contain data related to the user's Mobile device 201, such as the manufacturer, model, display size, software version, settings, etc. A Content Session Data 246 which connects to the Lock Screen 208, the Rewards application 212, the News app application 216, and the Persistent Notification 220 through Connectors 210, 214, 218, 222, which may URL connections to allow the transmission of data. The Content Session Data 246 may contain data related to the content the user has viewed, clicked, or accessed through the applications. A Notification Services 248 which connects to the Lock Screen 208, the Rewards application 212, the News app application 216, and the Persistent Notification 220 through Connectors 210, 214, 218, 222, which may URL connections to allow the transmission of data.

The Notification Services 248 may be the notification settings for the user, scheduling notifications, or managing user notifications preferences within the applications. A Content Server 250 provides a pathway from the Mobile device 201 to 3rd Parties such as 3rd party search engines, for example, Google, Bing, etc., fetching content from 3rd Parties 256 such as App Developers 258, and Advertisers 260, or 3rd Party news aggregators. In some embodiments, the Content Server 250 may contain various 3rd party APIs. An Analytics/Monitoring module 252 provides data related to the user's behavior such as the user's activity on the applications, clicks, views, user trends, or the number of times the user has accessed the applications or number of times the user has accessed certain content.

A Wallet 254 which contains the user's transaction history related to the Rewards application 212, such as the amount of coins, points, or monetary value the user has collected and the items that the user has exchanged the currency for, such as gift cards, vouchers, other physical gifts, minutes, or data for their cellular plans, etc. Various 3rd Parties 256 provide data, information, applications, or advertisements to the Platform 236 that is passed onto the applications located on the Mobile device 201. The 3rd Parties 256 maybe 3rd party search engines, for example, Google, Bing, etc., fetching content from 3rd Parties 256 such as App Developers 258, and Advertisers 260, or 3rd Party news aggregators and may include APIs to allow the transmission of data into the Platform 236. Various App Developers 258 are developers that create, test, and program apps for computers, mobile phones, and tablets, that may be offered on the applications on the Mobile device 201 through the Platform 236. Various Advertisers 260 which are 3rd parties that may have partnerships or agreement with the Platform to advertise on the applications located on the Mobile device 201.

The Popular App Module 235 is initiated to determine which applications should be displayed on the application, such as applications that the user has downloaded and frequently uses, such as a map or GPS application, social networking applications, messaging applications, etc. The most popular apps can be those apps that are (1) used most frequently in general, (2) used most frequently in a particular day, (3) used most frequently in a series of apps, (4) used because of the vital importance, such as a security alert app, etc. Although there are many ways that popular apps can be determined, it should be obvious to those skilled in the art that there is a plurality of ways to determine the most popular apps. Also, it should be obvious to those skilled in the art that algorithms are associated with suggesting the most popular apps. The Advertise App Module 237 is activated to determine which advertisements and recommended applications should be displayed on the Persistent Notification 220.

Figure 3:
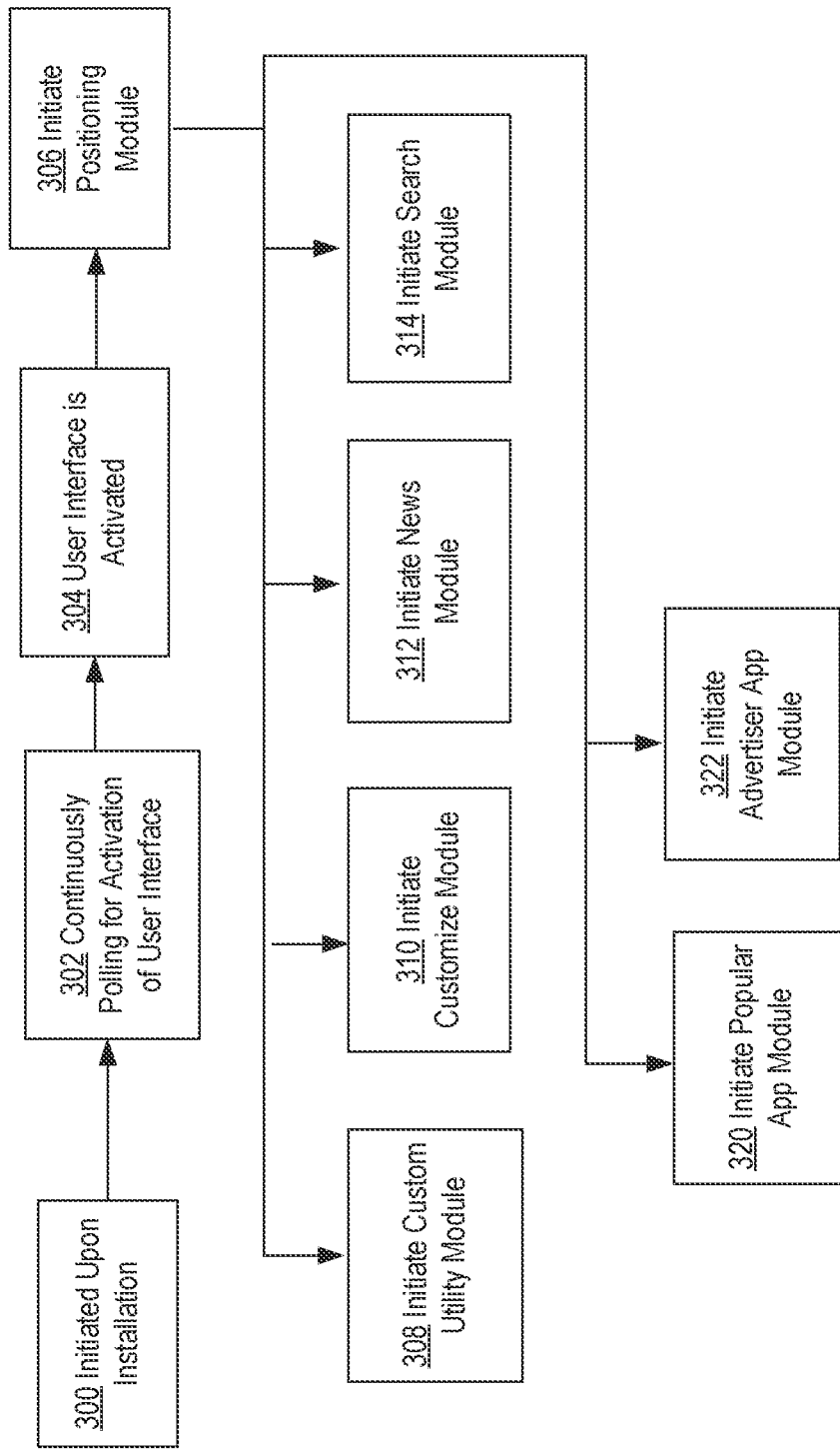
FIG. 3 illustrates is a flowchart illustrating an exemplary method of implementing a Base Module in accordance with an embodiment.

FIG. 3 illustrates is a flowchart illustrating an exemplary method of implementing a Base Module. The process may begin with the Base Module 206 being initiated when the application is installed on the Operating System 202. In some embodiments, the application may be preinstalled on the Mobile Device Operating System 202 that looks native to the Mobile Device's 201 interface or is displayed in a manner which is displayed in a similar manner to the user interface of the Mobile device 201. In some embodiments, the application may be installed when the user activates the Mobile device 201 for the first time, in which the user may be sent prompts or input requests to allow the application access to their data, share content with 3rd parties, privacy policy, or other agreements to perform the functions of the application. In some embodiments, the user may have to create an account for the application, at step 300.

Then the Base Module 206 is continuously polling for the user to activate the user interface which may be turning on the display, unlocking the device, etc. In some embodiments, once the user interface is activated the Positioning Module 224, the Custom Utility Module 226, the Customize Module 228, News Module 230, and the Search Module 232 may be initiated simultaneously to allow the application notification to contain all the necessary data to perform the functions of the application, at step 302. Then the Base Module 206 determines that the user interface has been activated by the user, for example, the user may turn on the display, unlock the device, etc., at step 304.

The Base Module 206 initiates the Positioning Module 224 or the Positioning Module 224 may be initiated from the user activating the user interface such as turning on the display, activating the screen, or unlocking the device. The Positioning Module 224 sends a request to the Platform 236 for the Device Specification 244 located on the Dynamic Layout Configuration 238. For example, the Positioning Module 224 is sending a request for the specification data related to the device such as the manufacturer, model, size of the device, size of the screen or display, resolution of the device, etc. in order to display the notification in a manner and style similar to the device so the notification looks native to the device. Then the Positioning Module 224 receives the Device Specification 244 data to allow the notification to appear to be visually native to the device by using the specification data, for example, manufacturer, model, size of the device, size of the screen or display, resolution of the device, etc.

Then the Positioning Module 224 displays the notification on the user interface of the Mobile device 201 at the top of the display screen or interface to allow the user to view the application as the first notification. In some embodiments, the Custom Utility Module 226, Customize Module 228, News Module 230, and the Search Module 232 may have already been performed to allow the notification to include additional functions of the application, for example, the most frequently used utility applications, for example, the calculator, camera, maps or GPS, etc. through the Custom Utility Module 226, the most frequently used applications by the user, for example, social networking, messaging applications, etc. through the Customize Module 228, providing the user with a news feed through the News Module 230, and providing the user the ability to search the internet or web through the Search Module 232, and the Positioning Module 224 returns to the Base Module 206, at step 306.

The Base Module 206 initiates the Custom Utility Module 226 or the Custom Utility Module 226 may be initiated from the user activating the user interface such as turning on the display, activating the screen, or unlocking the device, to provide the most frequently used utility applications on the notification displayed on the Mobile device 201. The Custom Utility Module 226 sends a request for the User Actions Data 242 and Notifications services 248 located on the Dynamic Layout Configuration 238. For example, the Custom Utility Module 226 is sending a request to the Platform 236 for the most frequently used or previously selected utility applications that should appear on the notification to the user, for example, the camera, calculator, maps or GPS, etc. In some embodiments, the user may select which utility applications they desire to appear on the notification by selecting the applications through a list of available utility applications available on the device.

The Custom Utility Module 226 receives the utility application data from the User Actions Data 242 and Notifications services 248 to provide the user with the utility applications within the notification from the application provided by the Platform 236 to allow the utility applications to be launched directly from the notification. Then the Custom Utility Module 226 displays the most frequently used utility applications on the notification allowing a user to launch the utility applications directly from the received notification and the Custom Utility Module 226 returns to the Base Module 206, at step 308.

The Base Module 206 initiates the Customize Module 228 or the Customize Module 228 may be initiated from the user activating the user interface such as turning on the display, activating the screen, or unlocking the device, to provide the most frequently used applications on the notification displayed on the Mobile device 201. The Customize Module 228 sends a request for the User Actions Data 242, Content Session Data 246, and Notifications services 248 located on the Dynamic Layout Configuration 238. For example, the Customize Module 228 is sending a request to the Platform 236 for the most frequently used or previously selected applications that should appear on the notification to the user, for example, the social networking applications, messaging applications, etc. In some embodiments, the user may select which applications they desire to appear on the notification by selecting the applications through a list of available applications available on the device. In some embodiments, the applications that appear to the user may be recommended or advertised applications through 3rd Parties 256 that are sent to the Platform 236.

The Customize Module 228 receives the application data from the User Actions Data 242, Content Session Data 246, and Notifications services 248 to provide the user with the applications within the notification from the application provided by the Platform 236 to allow the most frequently used applications to be launched directly from the notification. Then the Customize Module 228 displays the most frequently used applications on the notification allowing a user to launch the applications directly from the received notification and the Customize Module 228 returns to the Base Module 206, at step 310.

Then the Base Module 206 initiates the News Module 230 or the News Module 230 may be initiated from the user activating the user interface such as turning on the display, activating the screen, or unlocking the device, to provide the user with a news feed function on the notification. The News Module 230 determines if the user selected the News app application 216 on the notification. If it is determined that the user selected the News app application 216 on the notification then the News Module 230 launches the News app application 216. If it is determined that the user did not select the News app application 216 or if the user closes, ends, or terminates the News app application 216 the News Module 230 returns to the Base Module 206, at step 312.

The Base Module 206 initiates the Search Module 232 or the Search Module 232 may be initiated from the user activating the user interface such as turning on the display, activating the screen, or unlocking the device, to provide the user the ability to search the internet or web through 3rd Party search engines, for example, Google, Bing, etc., via the Content Server 250. The Search Module 232 determines if the user selected the search function on the notification provided by the Platform 236. If it is determined that the user selected the search function on the notification provided by the Platform 236, then the user inputs the search terms into the search bar within the notification in the application provided by the Platform 236. Then the Search Module 232 sends the search terms to the Content Server 250 which sends the terms to a 3rd party search engine and receives the search results from the 3rd Party search engine, for example, Google, Bing, etc. Then the Search Module 232 receives the search results from the Content Server 250. In some embodiments, the search function on the notification provided by the Platform 236 may launch or initiate a 3rd Party search engine application in which the Search Module 232 is continuously polling for the user to exit the application and would bring the user back to the original notification in which the search was prompted. Then the Search Module 232 displays the received search results from the Content Server 250 on the Mobile device 201 user interface to allow the user to scroll through the search results that were provided by the 3rd Party search engine to the Content server 250. If it is determined that the user did not select the search function or if the user closes, ends, or terminates the search function of the notification then the Search Module 132 returns to the Base Module 206, at step 314.

Figure 4:
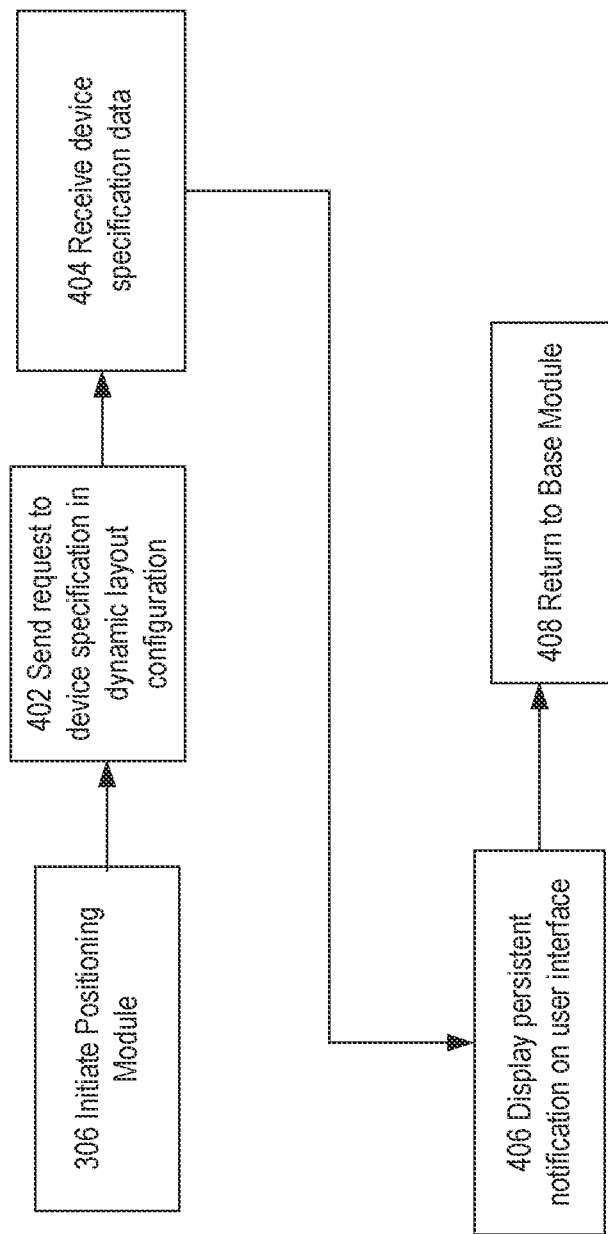
FIG. 4 illustrates is a flowchart illustrating an exemplary method of implementing a Positioning Module in accordance with an embodiment.

FIG. 4 illustrates is a flowchart illustrating an exemplary method of implementing a Positioning Module. The process may begin with the Positioning Module 124 being initiated by the Base Module 206. In some embodiments, the Positioning Module 124 may be initiated from the user activating the user interface such as turning on the display, activating the screen, or unlocking the device, at step 306, continuing from FIG. 3. Then the Positioning Module 124 sends a request to the Platform 236 for the Device Specification 144 located on the Dynamic Layout Configuration 238. For example, the Positioning Module 124 is sending a request for the specification data related to the device such as the manufacturer, model, size of the device, size of the screen or display, resolution of the device, etc. in order to display the notification in a manner and style similar to the device so the notification looks native to the device, at step 402.

The Positioning Module 124 may receive the Device Specification 144 data to allow the notification to appear to be visually native to the device by using the specification data, for example, manufacturer, model, size of the device, size of the screen or display, resolution of the device, etc., at step 404. The Positioning Module 124 may display the notification on the user interface of the Mobile Device 101 at the top of the display screen or interface to allow the user to view the application as the first notification.

In some embodiments, the Custom Utility Module 126, Customize Module 128, News Module 130, and the Search Module 132 may have already been performed to allow the notification to include additional functions of the application, for example, the most frequently used utility applications, for example, the calculator, camera, maps or GPS, etc. through the Custom Utility Module 126, the most frequently used applications by the user, for example, social networking, messaging applications, etc. through the Customize Module 128, providing the user with a news feed through the News Module 130, and providing the user the ability to search the internet or web through the Search Module 132, at step 406. Then the Positioning Module 124 returns to the Base Module 206, at step 408.

Figure 5:
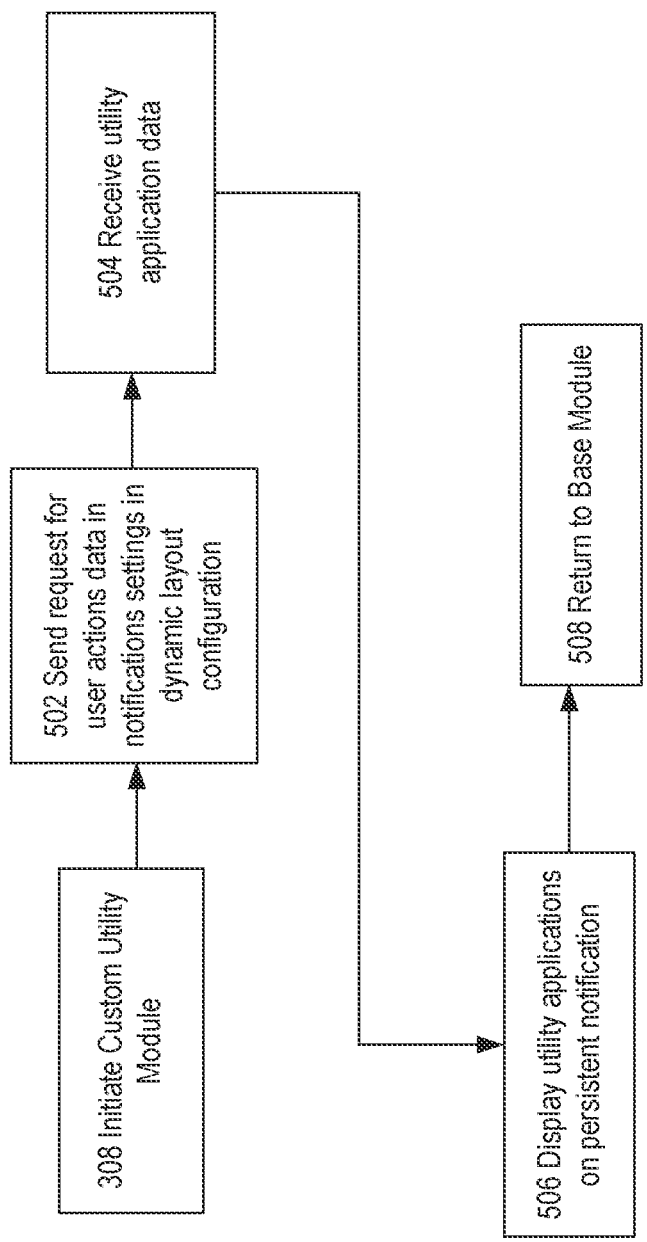
FIG. 5 illustrates is a flowchart illustrating an exemplary method of implementing a Custom Utility Module in accordance with an embodiment.

FIG. 5 illustrates is a flowchart illustrating an exemplary method of implementing a Custom Utility Module. The process may begin with the Custom Utility Module 126 being initiated by the Base Module 206. In some embodiments, the Custom Utility Module 126 may be initiated from the user activating the user interface such as turning on the display, activating the screen, or unlocking the device, to provide the most frequently used utility applications on the notification displayed on the Mobile Device 101, at step 308, continuing from FIG. 3. Then the Custom Utility Module 126 sends a request for the User Actions Data 142 and Notification Services 248 located on the Dynamic Layout Configuration 238. For example, the Custom Utility Module 126 is sending a request to the Platform 236 for the most frequently used or previously selected utility applications that should appear on the notification to the user, for example, the camera, calculator, maps or GPS, etc. In some embodiments, the user may select which utility applications they desire to appear on the notification by selecting the applications through a list of available utility applications available on the device, at step 502. The Custom Utility Module 126 receives the utility application data from the User Actions Data 142 and Notification services 248 to provide the user with the utility applications within the notification from the application provided by the Platform 236 to allow the utility applications to be launched directly from the notification, at step 504. Then the Custom Utility Module 126 displays the most frequently used utility applications on the notification allowing a user to launch the utility applications directly from the received notification, at step 506. Then the Custom Utility Module 126 returns to the Base Module 206, at step 508.

Figure 6:
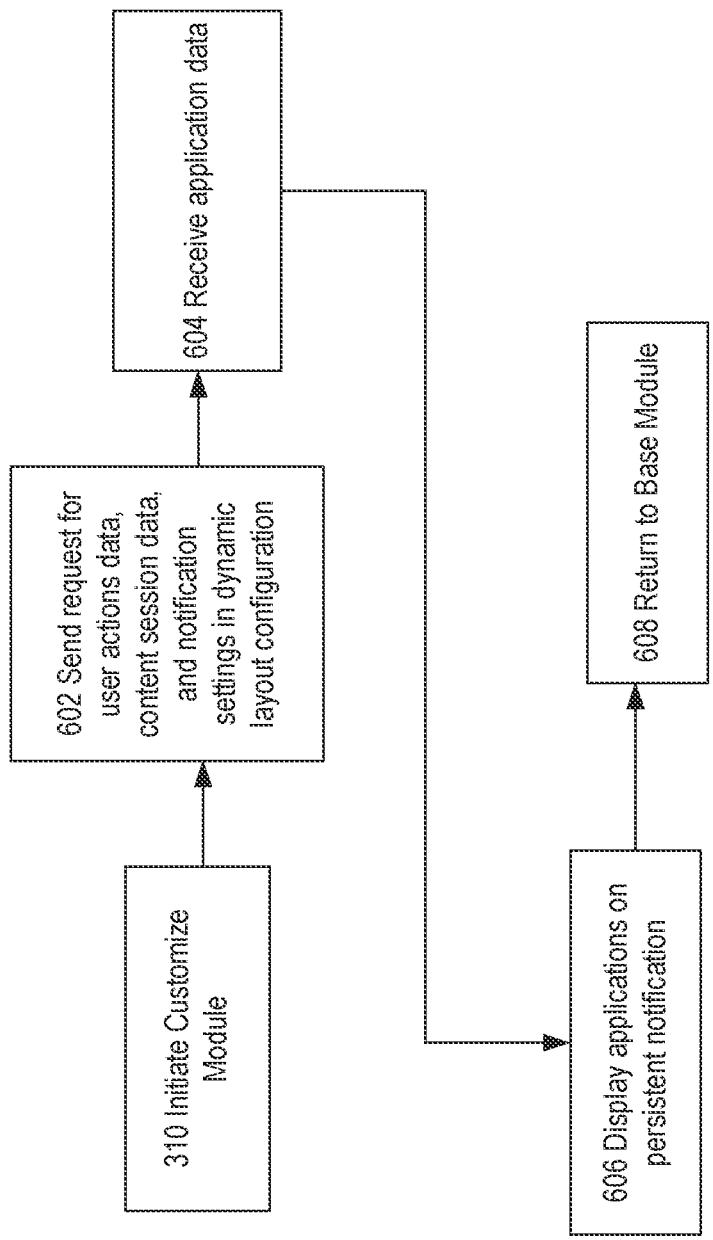
FIG. 6 illustrates is a flowchart illustrating an exemplary method of implementing a Customize Module in accordance with an embodiment.

FIG. 6 illustrates is a flowchart illustrating an exemplary method of implementing a Customize Module. The process may begin with the Customize Module 128 being initiated by the Base Module 206. In some embodiments, the Customize Module 128 may be initiated from the user activating the user interface such as turning on the display, activating the screen, or unlocking the device, to provide the most frequently used applications on the notification displayed on the Mobile Device 101, at step 310, continuing from FIG. 3. The Customize Module 128 may send a request for the User Actions Data 142, Content Session Data 146, and Notification services 248 located on the Dynamic Layout Configuration 238. For example, the Customize Module 128 is sending a request to the Platform 236 for the most frequently used or previously selected applications that should appear on the notification to the user, for example, the social networking applications, messaging applications, etc. In some embodiments, the user may select which applications they desire to appear on the notification by selecting the applications through a list of available applications available on the device. In some embodiments, the applications that appear to the user may be recommended or advertised applications through 3rd Parties Networks 256 that are sent to the Platform 236, at step 602.

The Customize Module 128 receives the application data from the User Actions Data 142, Content Session Data 146, and Notification services 248 to provide the user with the applications within the notification from the application provided by the Platform 236 to allow the most frequently used applications to be launched directly from the notification, at step 604. Then the Customize Module 128 displays the most frequently used applications on the notification allowing a user to launch the applications directly from the received notification, at step 606. Then the Customize Module 128 returns to the Base Module 206, at step 608.

Figure 7:
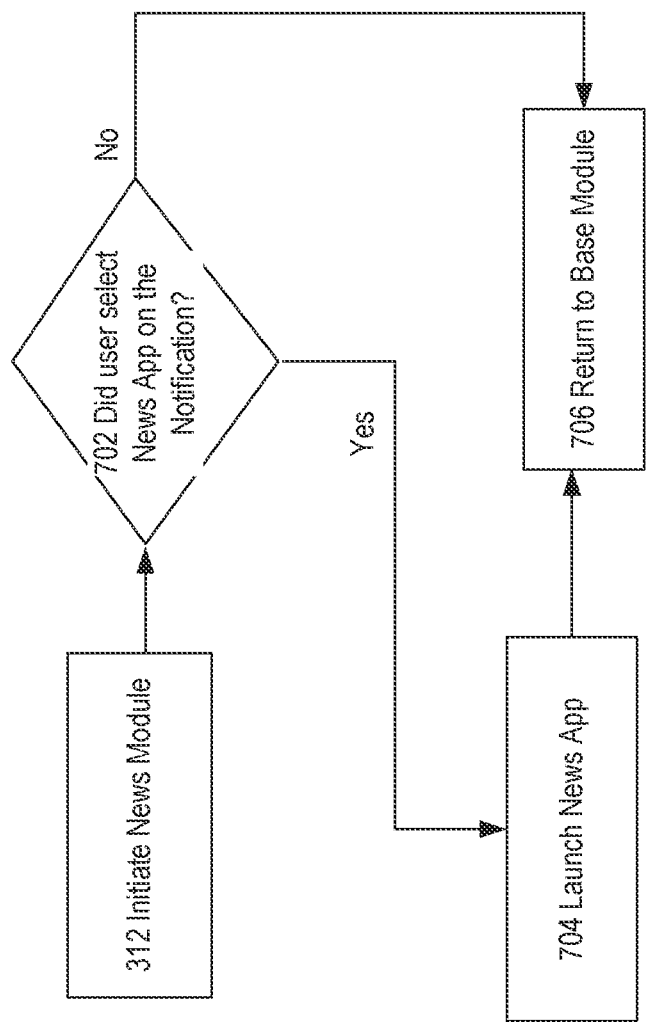
FIG. 7 illustrates is a flowchart illustrating an exemplary method of implementing a News Module in accordance with an embodiment.

FIG. 7 illustrates is a flowchart illustrating an exemplary method of implementing a News Module. The process may begin with the Base Module 206 initiating the News Module 130. In some embodiments, the News Module 130 may be initiated from the user activating the user interface such as turning on the display, activating the screen, or unlocking the device, to provide the user with a news feed function on the notification, at step 312, continuing from FIG. 3. Then the News Module 130 determines if the user selected the News app application 216 on the notification, at step 702. If it is determined that the user selected the News app application 216 on the notification then the News Module 130 launches the News app. The News app application 216 may be an application preinstalled on the Mobile Device Operating System 202 that looks native to the interface of the Mobile Device 101 or is displayed in a manner that is displayed in a similar manner to the user interface of the Mobile Device 101. In some embodiments, News app application 216 may be initiated through a notification on the Mobile Device 101 user interface in which the user is notified of a news article of interest and the user selects the article on the notification launching the application.

The News app application 216 may connect to the Platform 236 to request and receive data such as accessing a user account through the User Account 140, the actions of the user such as previously viewed or selected news articles through the User Actions Data 142, the specifications of the user's device such as display, screen or interface size through the Device Specification 144, the content the user has previously viewed or selected through the Content Session Data 146, or receive notifications from the Platform 236 through the Notification Services 148. The News app application 216 may also receive content, such as news articles that are aggregated for the user through the Content server 250, and the Analytics/Monitoring module 252 may be used to determine articles of interest to the user, determine previously viewed articles by the user so those news articles will not be shown to the user again, determine when the user was last shown an advertisement so the user will not be overwhelmed with advertisements or only shown advertisements periodically.

In some embodiments, the News app application 216 may be displayed as a section on a notification, either from the Lock Screen 108 or the persistent notification, and initiated when the user selects the news article to be brought to the news article through the News app. In some embodiments, the News app application 216 may be launched or initiated when the user activates the user interface to provide the notification provided by the Persistent Notification 220 with a news feed prior to the user selecting the News app application 216 on the notification so that the news data collected by the News app application 216 is already sent and ready to be displayed to the user when the user selects the News app, at step 704. If it is determined that the user did not select the News app application 216 or if the user closes, ends, or terminates the News app application 216 the News Module 130 returns to the Base Module 206, at step 706.

Figure 8:
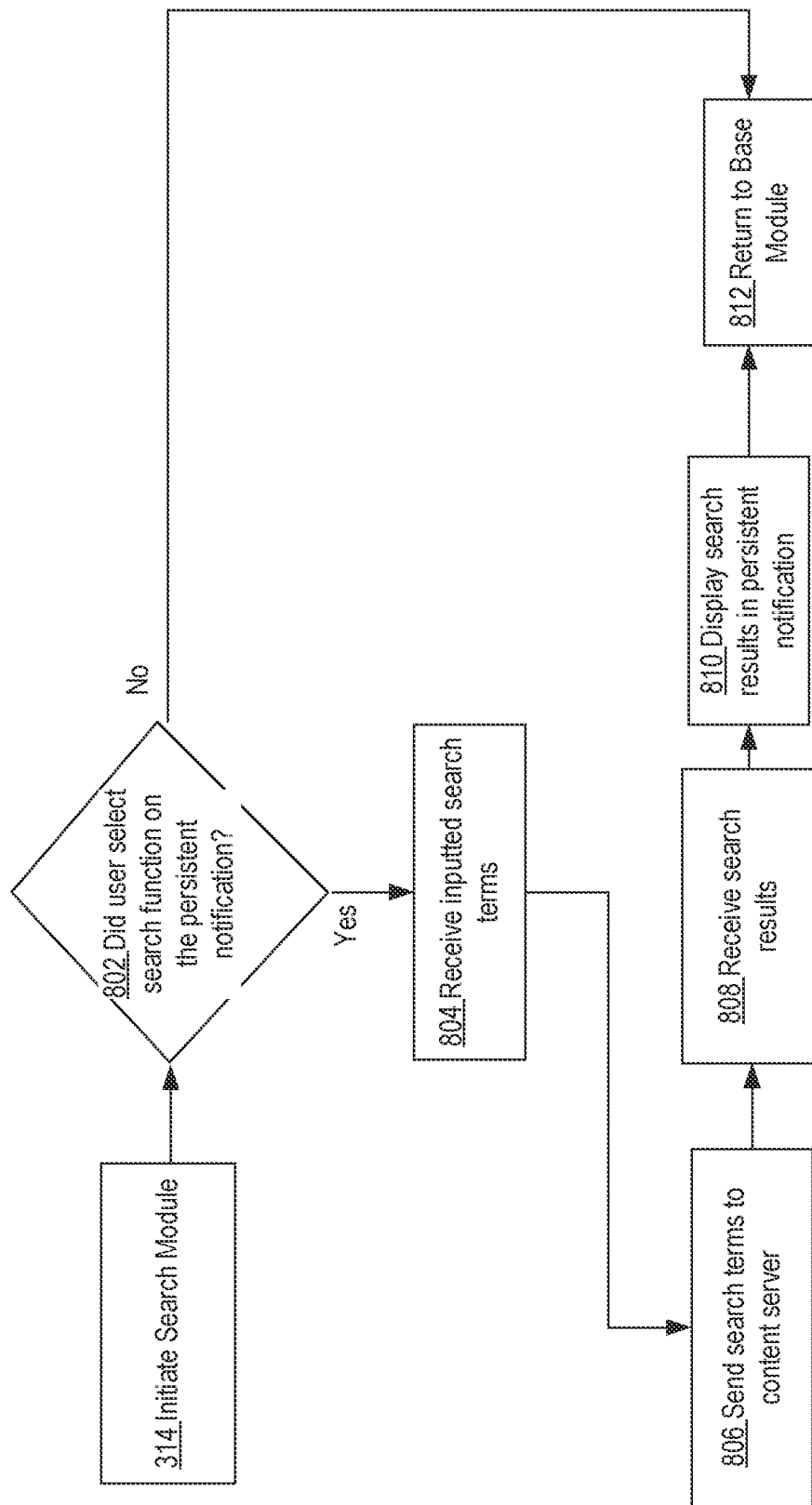
FIG. 8 illustrates is a flowchart illustrating an exemplary method of implementing a Search Module in accordance with an embodiment.

FIG. 8 illustrates is a flowchart illustrating an exemplary method of implementing a Search Module. The process may begin with the Search Module 132 being initiated by the Base Module 206. In some embodiments, the Search Module 132 may be initiated from the user activating the user interface such as turning on the display, activating the screen, or unlocking the device, to provide the user the ability to search the internet or web through 3rd Party search engines, for example, Google, Bing, etc., via the Content server 250, at step 314, continuing from FIG. 3. Then the Search Module 132 determines if the user selected the search function on the notification provided by the Platform 236, at step 802. If it is determined that the user selected the search function on the notification provided by the Platform 236, then the user inputs the search terms into the search bar within the notification in the application provided by the Platform 236, at step 804.

The Search Module 132 may send the search terms to the Content server 250 which sends the terms to a 3rd party search engine and receives the search results from the 3rd Party search engine, for example, Google, Bing, etc. The Content server 250 provides a pathway from the Mobile Device 101 to 3rd Parties such as 3rd party search engines, for example, Google, Bing, etc., fetching content from 3rd Parties Networks 256 such as App Developers 258, and Advertisers 260, or 3rd Party news aggregators. In some embodiments, the Content server 250 may contain various 3rd party APIs. In some embodiments, the search function on the notification provided by Platform launches or initiates the 3rd Party search engine application to allow the user to search the web or internet, at step 806. Then the Search Module 132 receives the search results from the Content server 250. In some embodiments, the search function on the notification provided by the Platform 236 may launch or initiate a 3rd Party search engine application in which the Search Module 132 is continuously polling for the user to exit the application and would bring the user back to the original notification in which the search was prompted, at step 808. Then the Search Module 132 displays the received search results from the Content server 250 on the Mobile Device 101 user interface to allow the user to scroll through the search results that were provided by the 3rd Party search engine to the Content server 250, at step 810. If it is determined that the user did not select the search function or if the user closes, ends, or terminates the search function of the notification then the Search Module 132 returns to the Base Module 206, at step 812.

Figure 9:
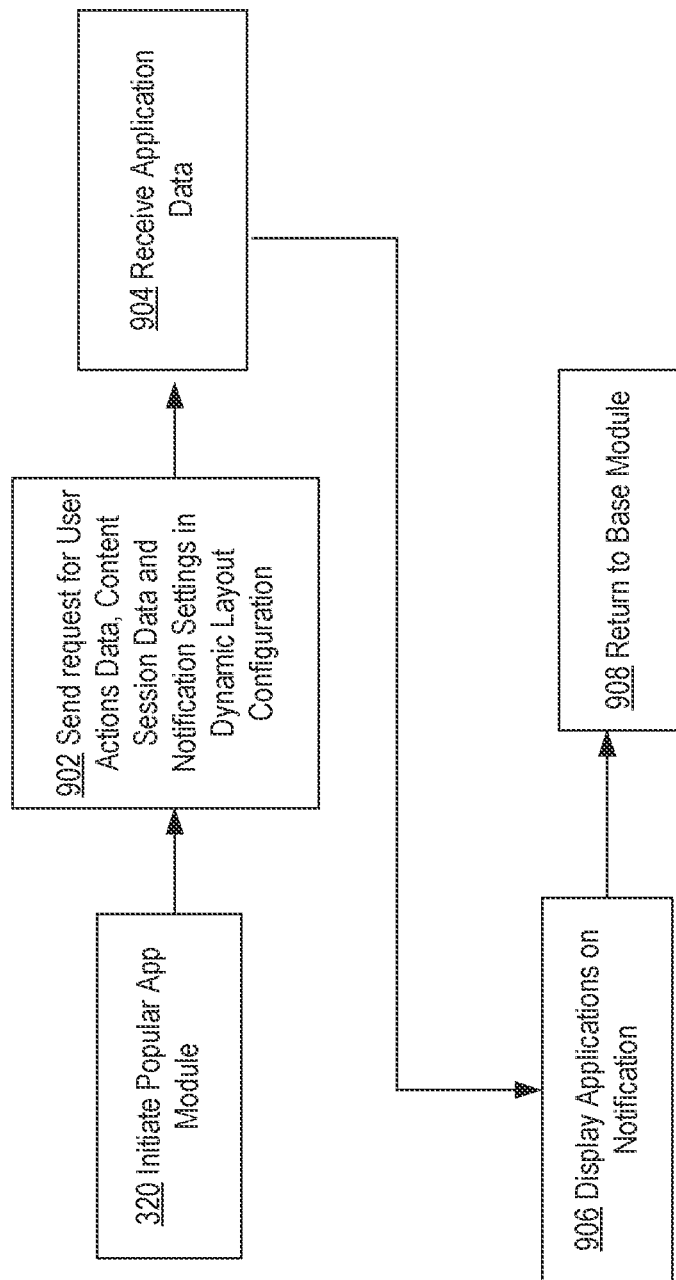
FIG. 9 illustrates is a flowchart illustrating an exemplary method of implementing a Popular App Module in accordance with an embodiment.

FIG. 9 illustrates a flowchart illustrating an exemplary method of implementing a Popular App Module in accordance with an embodiment.

The process begins with the Popular App Module 235 initiated by the Base Module 206. In some embodiments, the Popular App Module 235 may be initiated by activating the user interface, such as turning on the display, activating the screen, or unlocking the device. This provides the most frequently used applications on the notification displayed on the Mobile Device, at step 900. The Popular App Module 235 sends a request for the User Actions Data 242, Content Session Data 246, and Notification Services 248 located on the Dynamic Layout Configuration 238. For example, the Popular App Module 235 is sending a request to Platform 236 for the most frequently used or previously selected applications that should appear on the notification to the user, for example, the social networking applications, messaging applications, etc. In some embodiments, the user may select which applications they desire to appear on the notification by selecting the applications through a list of available applications available on the device. In some embodiments, the most frequently used applications by the user may appear as an icon on the notification, and once the user selects the icon, the most frequently used applications are shown as a list, grid, etc. to the user to allow the user to select the desired application, at step 902.

The Popular App Module 235 receives the application data from the User Actions Data 242, Content Session Data 246, and Notification Services 248 to provide the user with the applications within the notification from the application provided by Platform 236 to allow the most frequently used applications to be launched directly from the notification, at step 904. Then the Popular App Module 235 displays the most frequently used applications on the notification, allowing users to launch the applications directly from the received notification. In some embodiments, the most frequently used applications by the user may appear as an icon on the notification, and once the user selects the icon, the most frequently used applications are shown as a list, grid, etc. to the user to allow the user to select the desired application, at step 906. Then the Popular App Module 235 returns to the Base Module 206, at step 908.

Figure 10:
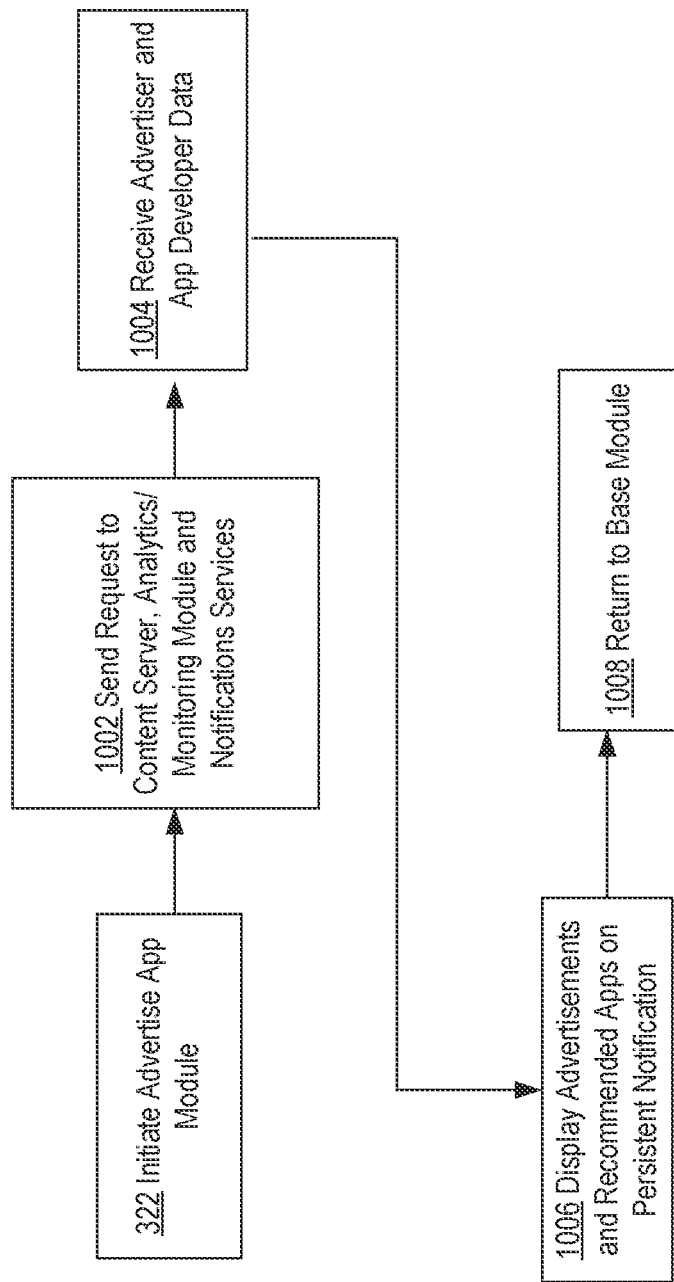
FIG. 10 illustrates is a flowchart illustrating an exemplary method of implementing an Advertise App Module in accordance with an embodiment.

FIG. 10 illustrates a flowchart illustrating an exemplary method of implementing an Advertise App Module in accordance with an embodiment. The process begins with the Advertise App Module 237 being initiated by Base Module 206. In some embodiments, the Advertise App Module 237 may be initiated by activating the user interface, such as turning on the display, activating the screen, or unlocking the device. This provides the most frequently used utility applications on the notification displayed on the Mobile Device 201, at step 1000. The Advertise App Module 237 sends a request to the Content Server 250, Analytics/Monitoring Module 252, and Notification Services 248 located on the Dynamic Layout Configuration 238. For example, the Advertise App Module 237 is sending a request to Platform 236 for the content provided by the App Developer Devices 258 and Advertiser Devices 260 from the 3rd Party Networks 256. App Developer Devices 258 are developers that create, test, and program apps for computers, mobile phones, and tablets offered on the applications on the Mobile Device 201 through Platform 236.

The App Developer Devices 258 may provide their application to Platform 236, such as on the Content Server 250, to advertise their application on the Mobile Device's 102 notification to allow a user to download or launch the application. The App Developer Devices 258 may have contracts, agreements, or other types of engagements with Platform 236 to advertise their application on the notifications provided by Platform 236. Advertiser Devices 260, which are 3rd parties that may have partnerships or agreement with Platform 236 to advertise on the applications located on the Mobile Device 201. The Advertiser Devices 260 may provide their advertisement content to Platform 236 and stored it on the Content Server 250 to allow users of the Platform 236 to view the Advertiser Devices 260 advertisement, for example, an advertisement may be a notice or announcement in a public medium, such as the Platform's 236 notification, promoting a product, service, event, or publicizing a job vacancy. The Advertise App Module 237 also sends a request to the Analytics/Monitoring Module 252 located on Platform 236.

This request determines how often a user is being sent notifications with an app or advertisement to determine if a previously determined user threshold has been reached, at step 1002. The Advertise App Module 237 receives the application and advertisement data from the Content Server 250, Analytics/Monitoring Module 252, and Notification Services 248 to provide the user with an application and advertisement within the notification provided by Platform 236 to allow the user to view an application, which may a recommended application, suggesting to download an application or application that the user currently has installed on the Mobile Device 201 that has an agreement, contract, or other types of engagement with the Platform 236, and an advertisement from a $3^{rd}$ Party, at step 1004. Then the Advertise App Module 237 displays the application and advertisement on the notification provided by Platform 236, allowing the user to view a recommended application and an advertisement within the notification, at step 606. The Advertise App Module 237 then sends the advertisement data to the Monetization Module 253 of Platform 236 and then returns to the Base Module 206, at step 1008.

The Monetization Database 255 (shown in FIG. 2) allows the Monetization Module 253 to send and receive its data. The Monetization Database 255 stores data for each user. The Monetization Database 255 of Platform 236 allows for the storage of alpha or numeric data for each user. The Monetization Database 255 of Platform 236 allows for the storage of alpha or numeric data for each period. The Monetization Database 255 of Platform 236 allows for the storage of alpha or numeric data for each popular app being used. The Monetization Database 255 of Platform 236 allows for the storage of alpha or numeric data for each advertisement. The Monetization Database 255 of Platform 236 allows for the storage of alpha or numeric data for each stakeholder (Platform 236, advertiser, users, application owner, OS owners, mobile device manufacturers).

The Monetization Module 253 of Platform 236 allows for the storage of alpha or numeric data to the Monetization Database 255. [0029] The Monetization Module 253 of Platform 236 allows for communications with all other related modules of the Mobile Device 201 or the Platform 236 or 3rd Party Networks 256. The Monetization Module 253 of Platform 236 allows for payments and credits for all the various stakeholders.

Figure 11A:
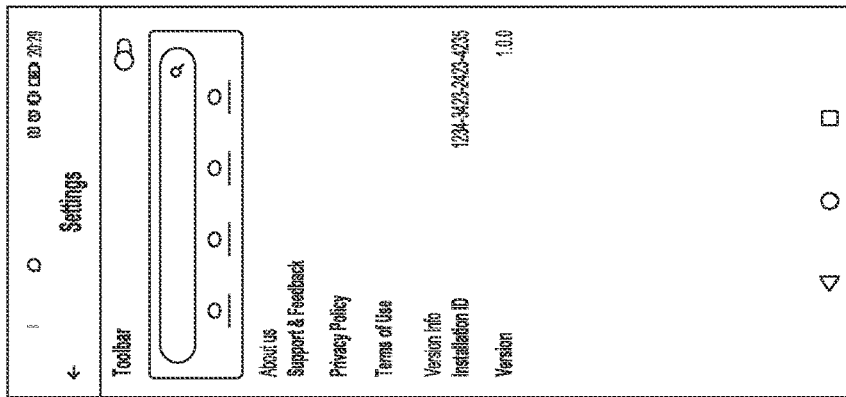

FIGS. 11A-11I illustrate graphical user interfaces (GUIs) depicting an implementation of a native toolbar with enhanced functions in a notification. These GUIs display examples of the user interface of the application provided by the Platform 236. FIG. 11A displays the settings available to the user for the application, including the ability to position applications on the toolbar such as the most frequently used applications or the utility applications the user desires to be displayed when the Persistent Notification 220 is displayed on their user interface. The settings also include support and feedback for the application, privacy policy, and terms of use which the user may have to accept or acknowledge prior to using the application so that the application can access the necessary user data, user content data, or user device data to allow the application to function properly. The settings also include the installation ID as well as the version of the application currently on the user's device.

Figure 11B:
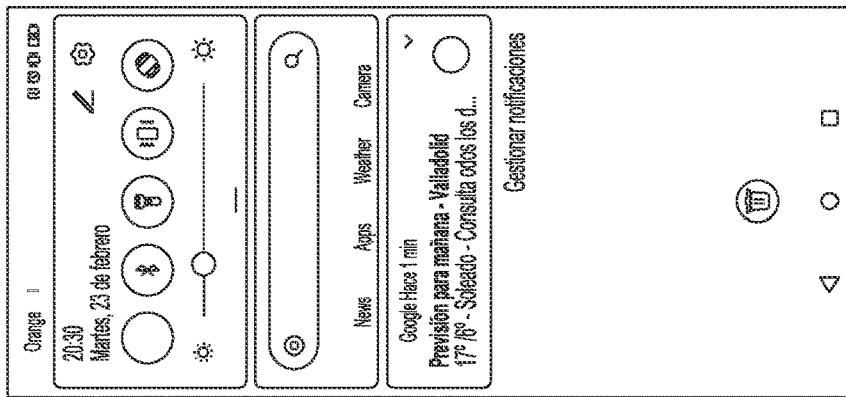

FIG. 11B displays a user interface example of the Persistent Notification 220 notification which includes a search bar, icons for the news feed labeled "News", an icon for most frequently used applications by the user labeled "Apps", and utility applications that are frequently used by the user which in this example is the "camera" and "weather" applications. The notification appears on the user interface through the process described in the Base Module 206, the Positioning Module 224, the Custom Utility Module 226, the Customize Module 228, the News Module 230, and the Search Module 232. The notification is positioned at the top of the user interface through the Positioning Module 224. The "camera" and "weather" icons appear on the notification through the Custom Utility Module 228, the user may select in the settings interface which utility applications they prefer to see when the notification appears, or the most frequently used utility applications may be displayed to the user.

The "apps" icon appears on the notification which contains the most frequently used applications by the user such as social networking, messaging applications, etc. through the process described in the Customize Module 128. The "News" icon appears on the notification through the process described in the News Module 130 and when selected by the user provides a news feed of news article that may be interesting to the user. The search bar appears on the notification through the process described in the Search Module 132 and allows the user to search the web or internet through 3rd party search engines.

Figure 11C:
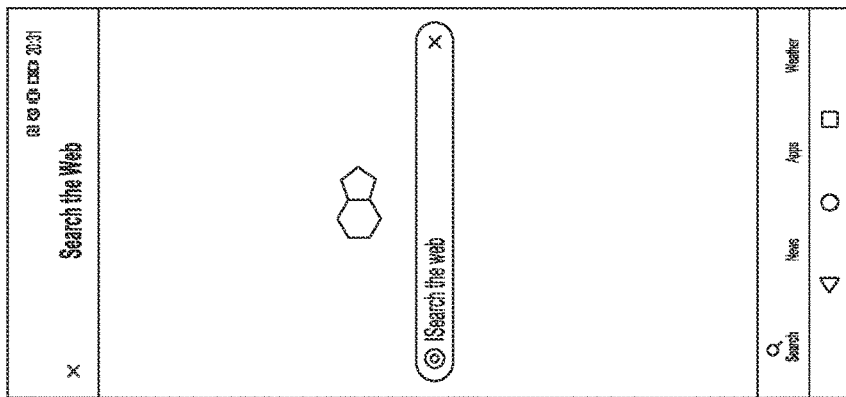

FIG. 11C displays the search function within the application when the device is unlocked by the user which allows the user to search the web or internet through 3rd party search engines through the process described in the Search Module 132. At the bottom of the interface are icons for the application, such as the currently selected "Search" function, an icon for the news feed labeled "News", an icon for most frequently used applications by the user labeled "Apps", and a utility application that is frequently used by the user which in the case in the "weather". When the icon is selected the corresponding module is initiated or in some embodiments, the modules are continuously running in order to allow the user with the selected information once they select the icon. For example, when the user selects the "News" icon the News Module 130 is initiated to provide the user with a news feed via the News app application 216 when the "Apps" icon is selected the Customize Module 128 is initiated allowing the user to view the most frequently used applications, and the Custom Utility Model 126 is initiated to provide the user with a "Weather" icon which is determined to be the previously selected utility application or the most frequently used utility application by the user.

Figure 11D:
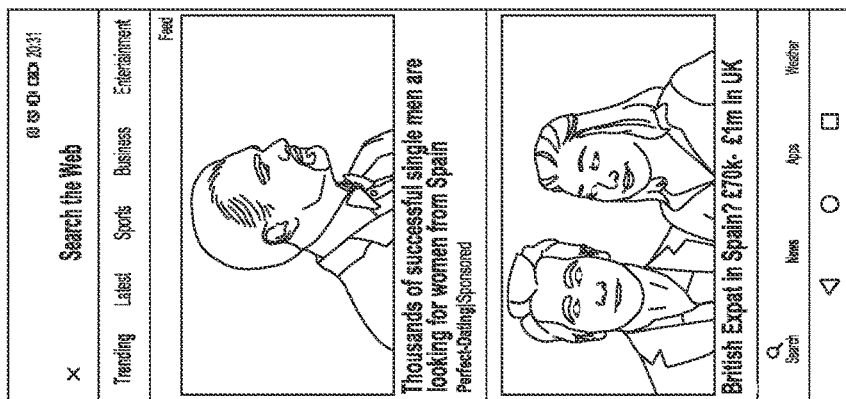

FIG. 11D displays an example of the news feed which is provided through the process described in the News Module 130 which is initiated by the Base Module 206. In some embodiments, the News Module 130 may be initiated from the user activating the user interface such as turning on the display, activating the screen, or unlocking the device, to provide the user with a news feed function. Then the News Module 130 determines if the user selected the News app application 216 on the notification or through the application. If it is determined that the user selected the News app application 216 on the notification then the News Module 130 launches the News app. The News app application 216 may be an application preinstalled on the Mobile Device Operating System 202 that looks native to the Mobile Device's 201 interface or is displayed in a manner which is displayed in a similar manner to the user interface of the Mobile Device 101. In some embodiments, News app application 216 may be initiated through a notification on the Mobile Device 101 user interface in which the user is notified of a news article of interest and the user selects the article on the notification launching the application. The News app application 216 may connect to the Platform 236 to request and receive data such as accessing a user account through the User Account 140, the actions of the user such as previously viewed or selected news articles through the User Actions Data 142, the specifications of the user's device such as display, screen or interface size through the Device Specification 144, the content the user has previously viewed or selected through the Content Session Data 146, or receive notifications from the Platform 236 through the Notification Services 148.

The News app application 216 may also receive content, such as news articles that are aggregated for the user through the Content server 250, and the Analytics/Monitoring module 252 may be used to determine articles of interest to the user, determine previously viewed articles by the user so those news articles will not be shown to the user again, determine when the user was last shown an advertisement so the user will not be overwhelmed with advertisements or only shown advertisements periodically.

In some embodiments, the News app application 216 may be displayed as a section on a notification, either from the Lock Screen 108, the Persistent notification 220, or when the application is opened, initiated, or launched by the user and initiated when the user selects the news article to be brought to the news article through the News app. In some embodiments, the News app application 216 may be launched or initiated when the user activates the user interface to provide the notification provided by the Persistent Notification 220 with a news feed prior to the user selecting the News app application 216 on the notification so that the news data collected by the News app application 216 is already sent and ready to be displayed to the user when the user selects the News app.

FIG. 11E displays another embodiment for the user interface example of the Persistent Notification 220, which includes a search bar, icons for the news feed labeled "News", an icon for most frequently used applications by the user labeled "Apps", and utility applications that are frequently used by the user which in this example is the "camera" and "weather" applications.

FIG. 11F displays an example for the user interface for displaying the "Apps" associated the Persistent notification 220. FIG. 11G displays an example of the user interface displaying the News app application 216 which is initiated through Persistent notification 220. FIG. 11H displays an example of the user interface for the Search bar. FIG. 11I displays an example of the user interface for the "Weather" App which is initiated through the Persistent notification 220.

Figure 12A:
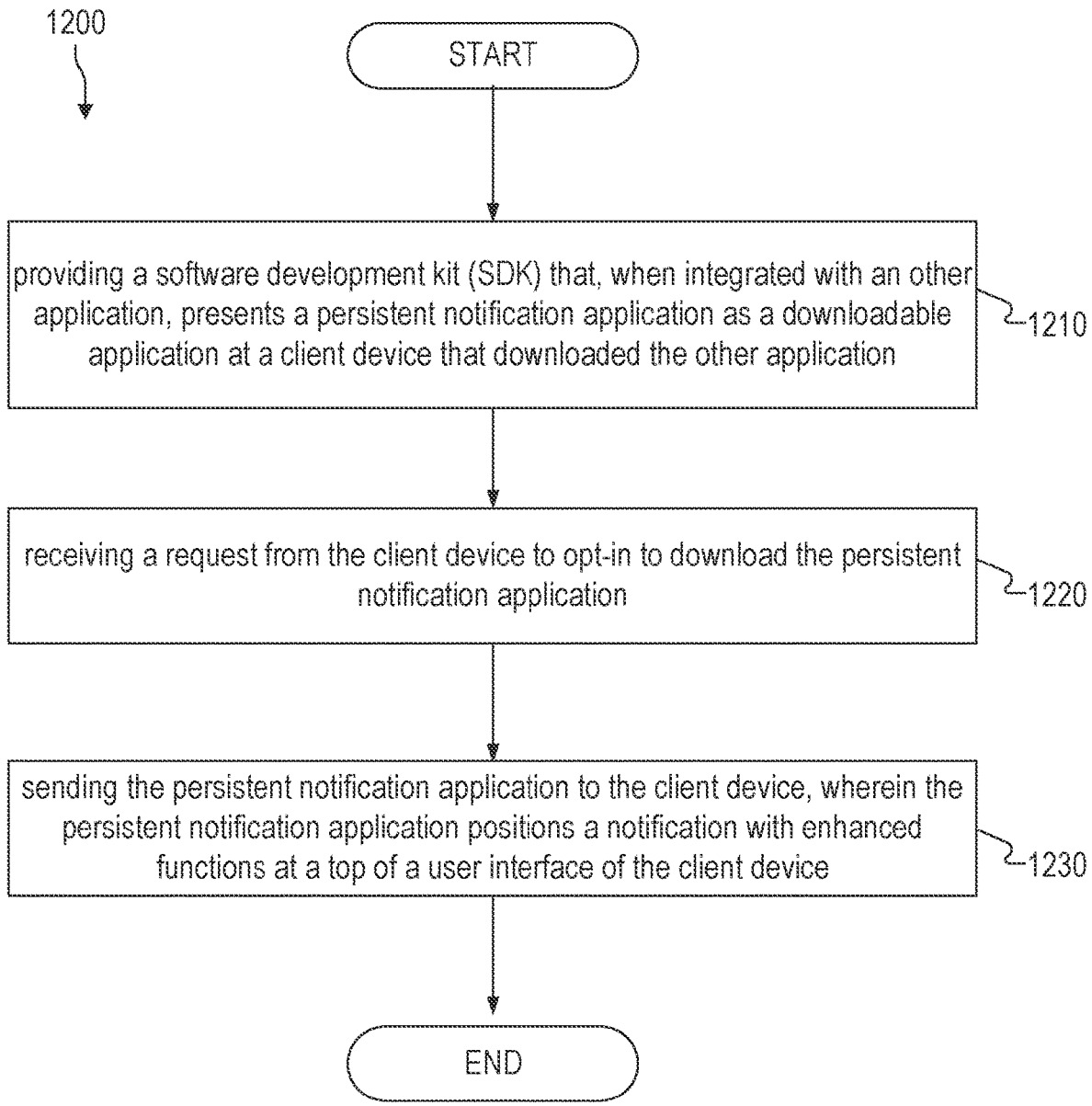
FIG. 12A is a flowchart illustrating an exemplary method of providing a software development kit (SDK) that integrates a persistent notification in accordance with an embodiment.

FIG. 12A is a flowchart illustrating an exemplary method of implementing a native toolbar with enhanced functions in a notification. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

According to some aspects, the method includes providing a software development kit (SDK) that, when integrated with another application, presents a persistent notification application as a downloadable application at a client device that downloaded the other application at step 1010. For example, the platform server 104 illustrated in FIG. 1 may provide a software development kit (SDK) that, when integrated with another application, presents a persistent notification application as a downloadable application at a client device that downloaded the other application.

According to some aspects, the method includes receiving a request from the client device to opt-in to download the downloadable persistent notification application at step 1220. For example, the platform server 104 illustrated in FIG. 1 may receive a request from the client device to opt-in to download the downloadable persistent notification application.

According to some aspects, the method includes sending the downloadable persistent notification to the client device at step 1230. For example, the platform server 104 illustrated in FIG. 1 may send the downloadable persistent notification to the client device. In some aspects, the downloadable persistent notification positions a notification with enhanced functions at the top of the user interface.

According to some aspects, the method includes providing a search bar for searching the Internet through 3rd party search engines. For example, the persistent notification 220 illustrated in FIG. 2 may provide a search bar for searching the Internet through 3rd party search engines. According to some aspects, the method includes collecting user action data, content session data, and notification settings data to provide more suitable search results when the user searches via the search bar. For example, the platform server 104 and/or the SDK 102 illustrated in FIG. 1 may collect user action data, content session data, and notification settings data to provide more suitable search results when the user searches via the search bar. In some aspects, the persistent notification comprises a search bar and a set of icons associated with applications.

In some aspects, the persistent notification application is presented in an onboarding process for another application. In some aspects, a download option for the persistent notification application is presented as an overlay at the client device after the other application is downloaded. In some aspects, the downloadable persistent notification positions the notification at the top of the user interface by leveraging a mobile operating system notification framework.

In some aspects, the persistent notification application sets a permanent position for the persistent notification at a top position associated with a newest notification. In some aspects, the persistent notification application polls for activation of a user interface. In some aspects, determines that the user interface is activated. In some aspects, the persistent notification application positions the persistent notification at the top of the user interface. In some aspects, the activation is turning on the phone, waking the phone, or pulling down a notification bar. In some aspects, the persistent notification application determines that a news feed function is selected and provides a new feed within the persistent notification.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

Figure 12B:
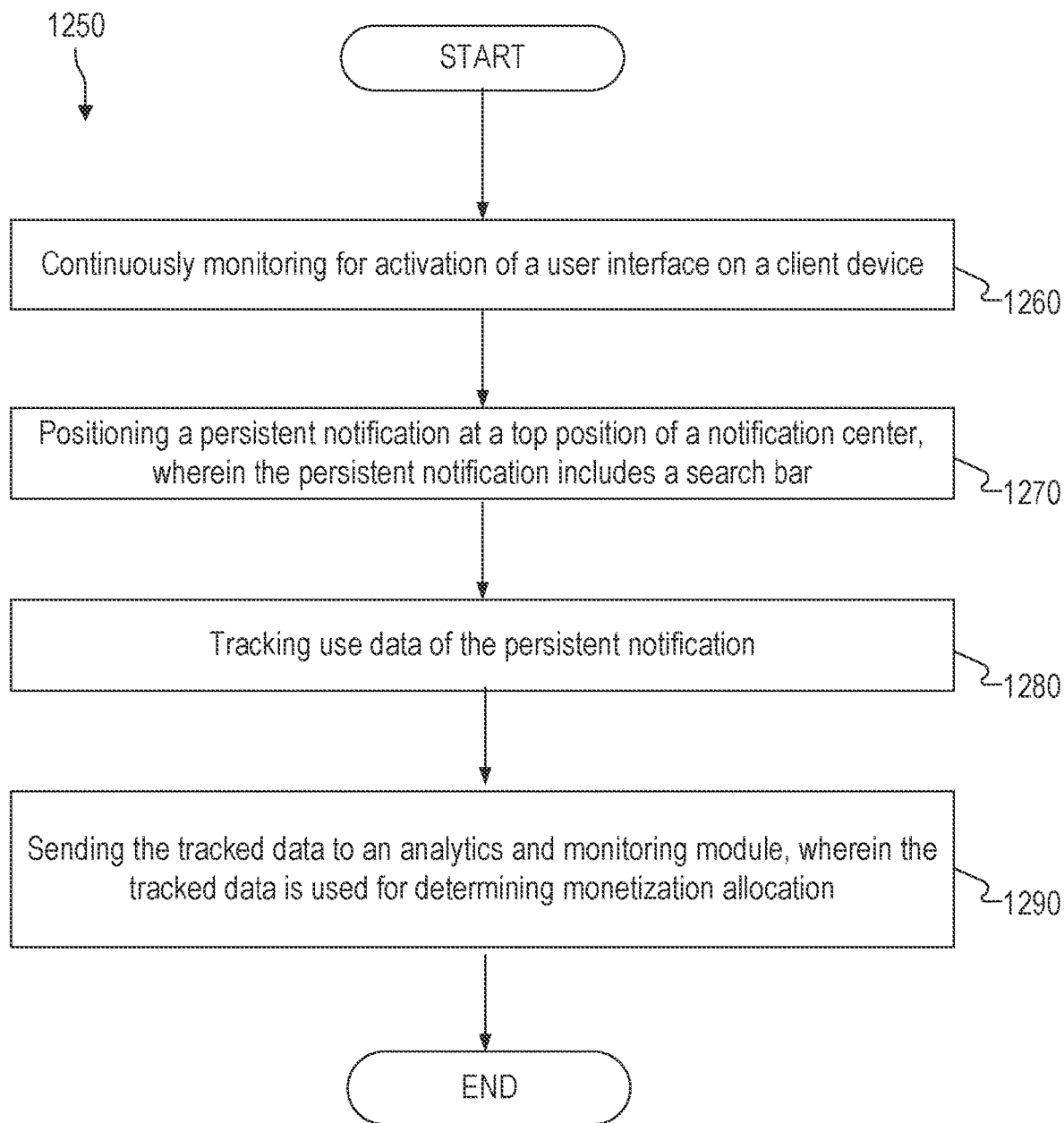
FIG. 12B is a flowchart illustrating an exemplary method of implementing a native toolbar with enhanced functions in a notification in accordance with an embodiment.

FIG. 12B is a flowchart illustrating an exemplary method of implementing a native toolbar with enhanced functions in a notification in accordance with an embodiment. Although the example method 1250 depicts a particular sequence of operations, the sequence may be altered without departing from the scope of the present disclosure. For example, some of the operations depicted may be performed in parallel or in a different sequence that does not materially affect the function of the method 1250. In other examples, different components of an example device or system that implements the method 1250 may perform functions at substantially the same time or in a specific sequence.

According to some aspects, the method includes continuously monitoring for activation of a user interface on a client device at step 1260. For example, base module 206 or the persistent notification application 220 illustrated in FIG. 2 may continuously monitor for activation of a user interface on a client device.

According to some aspects, the method includes positioning a persistent notification at a top position of a notification center at step 1270. For example, the positioning module 224 illustrated in FIG. 2 may position a persistent notification at a top position of a notification center. In some aspects, the persistent notification includes a search bar. The search bar may provide search results from third-party databases when utilized.

According to some aspects, the method includes tracking use data of the persistent notification at step 1280. For example, the persistent notification application 220 illustrated in FIG. 2 may continuously monitor for activation of a user interface on a client device.

According to some aspects, the method includes sending the tracked data to an analytics and monitoring module, wherein the tracked data is used for determining monetization allocation at step 1290. For example, the persistent notification application 220 illustrated in FIG. 2 may send the tracked data to an analytics and monitoring module, wherein the tracked data is used for determining monetization allocation.

According to some aspects, the method includes determining a set of utility applications to be displayed at the persistent notification, wherein the determination is based on a frequency of use. For example, the persistent notification application 220 illustrated in FIG. 2 may determine a set of utility applications to be displayed at the persistent notification, wherein the determination is based on a frequency of use.

According to some aspects, the method includes triggering a search module based on activation of the search bar at the persistent notification. For example, the persistent notification application 220 illustrated in FIG. 2 may trigger a search module based on activation of the search bar at the persistent notification. According to some aspects, the method includes presenting search results sourced from one or more online databases. For example, the persistent notification application 220 illustrated in FIG. 2 may present search results sourced from one or more online databases.

According to some aspects, the method includes determining a list of third-party application partners. For example, the persistent notification application 220 illustrated in FIG. 2 may determine a list of third-party application partners. According to some aspects, the method includes giving priority to the third-party application partners in search results and in the set of utility applications. For example, the persistent notification application 220 illustrated in FIG. 2 may give priority to the third-party application partners in search results and in the set of utility applications.

According to some aspects, the method includes triggering a news module based on activation of a news module graphical element in the persistent notification. For example, the persistent notification application 220 illustrated in FIG. 2 may trigger a news module based on activation of a news module graphical element in the persistent notification. According to some aspects, the method includes presenting news articles sources from one or more online databases. For example, the persistent notification application 220 illustrated in FIG. 2 may present news articles sources from one or more online databases.

In some aspects, the monitoring is for activation of the notification center. In some aspects, activation of the notification center is opening the notification center or activating a lock screen.

Figure 13:
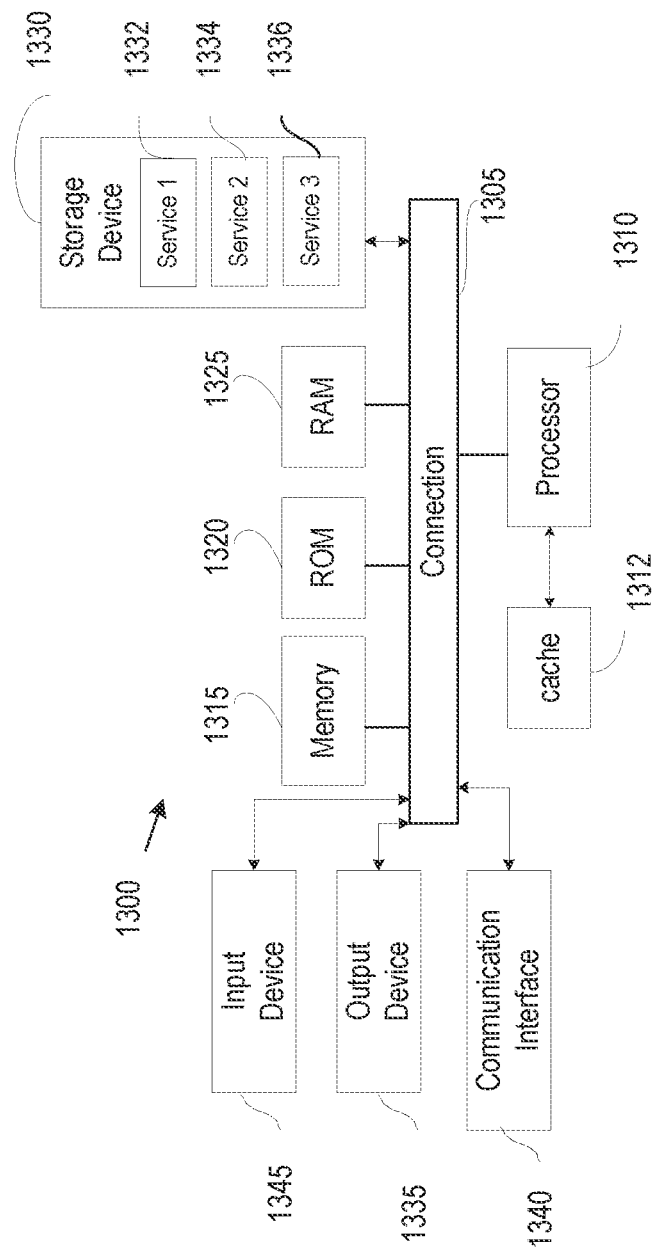
FIG. 13 shows an example of a computing system in accordance with an embodiment.

FIG. 13 shows an example of computing system 1300, which can be for example any computing device making up the mobile device 101, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement, and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for storage, analysis, and/or management of data. In some of these embodiments, data may be provided by users and/or received from external software. Many embodiments, and variations thereof, may provide for a framework for contests.

What is claimed is:

1. A method for integrating a persistent notification, comprising:
   providing a software development kit (SDK) that, when integrated with an other application, presents a persistent notification application as a downloadable application at a client device that downloaded the other application;
   receiving a request from the client device to opt-in to download the persistent notification application; and
   sending the persistent notification application to the client device, wherein the persistent notification application continually positions a notification with enhanced functions at a top position relative to other notifications of a notification center of a user interface of the client device, wherein the persistent notification comprises a search bar and a set of icons associated with applications.

2. The method of claim 1, wherein the persistent notification application is presented in an onboarding process for another application.

3. The method of claim 1, wherein a download option for the persistent notification application is presented as an overlay at the client device after the other application is downloaded.

4. The method of claim 1, wherein the persistent notification application positions the notification at the top position relative to the other notifications of the notification center of the user interface by leveraging a mobile operating system notification framework.

5. The method of claim 1, wherein the persistent notification application further:
   sets a permanent position for the persistent notification at the top position associated with a newest notification.

6. The method of claim 1, wherein the persistent notification application further:
   polls for activation of a user interface;
   determines that the user interface is activated; and
   positions the persistent notification at the top position relative to the other notifications of the notification center of the user interface.

7. The method of claim 6, wherein the activation is turning on the client device, waking the client device, or pulling down a notification bar.

8. The method of claim 1, wherein the persistent notification application further:
   determines that a news feed function is selected; and
   providing a news feed within the persistent notification.

9. The method of claim 1, wherein the persistent notification application further:
   provides the search bar for searching the Internet through 3rd party search engines.

10. The method of claim 9, further comprising:
    collecting user action data, content session data, and notification settings data to provide more suitable search results based on searching through the search bar.

11. A system for integrating a persistent notification, comprising:
    memory configured to store instructions; and
    one or more processors configured to execute the instructions and cause the one or more processors to:
       provide a software development kit (SDK) that, when integrated with an other application, presents a persistent notification application as a downloadable application at a client device that downloaded the other application;
       receive a request from the client device to opt-in to download the persistent notification application; and
       send the persistent notification application to the client device, wherein the persistent notification application continually positions a notification with enhanced functions at a top position relative to other notifications of a notification center of a user interface of the client device, wherein the persistent notification comprises a search bar and a set of icons associated with applications.

12. The system of claim 11, wherein the persistent notification application is presented in an onboarding process for another application.

13. The system of claim 11, wherein a download option for the persistent notification application is presented as an overlay at the client device after the other application is downloaded.

14. The system of claim 11, wherein the persistent notification application positions the notification at the top position relative to the other notifications of the notification center of the user interface by leveraging a mobile operating system notification framework.

15. The system of claim 11, wherein the persistent notification application further:
    sets a permanent position for the persistent notification at the top position relative to the other notifications of the notification center associated with a newest notification.

16. The system of claim 11, wherein the persistent notification application further:
    polls for activation of the user interface;
    determines that the user interface is activated; and
    positions the persistent notification at the top of the user interface.

17. A non-transitory computer-readable medium comprising instructions, the instructions, when executed by a computing system, cause the computing system to:
    provide a software development kit (SDK) that, when integrated with an other application, presents a persistent notification application as a downloadable application at a client device that downloaded the other application;
    receive a request from the client device to opt-in to download the persistent notification application; and
    send the persistent notification application to the client device, wherein the persistent notification application continually positions a persistent notification with enhanced functions at a top position relative to other notifications of a notification center of a user interface of the client device, wherein the persistent notification comprises a search bar and a set of icons associated with applications.

18. The non-transitory computer-readable medium of claim 17, wherein the persistent notification application further:
    sets a permanent position for a persistent notification at the top position associated with a newest notification.

19. The non-transitory computer-readable medium of claim 18, wherein the persistent notification application further:

polls for activation of the user interface;
determines that the user interface is activated; and
positions the persistent notification at the top position relative to the other notifications of the notification center of the user interface.

20. The non-transitory computer-readable medium of claim 17, wherein the non-transitory computer-readable medium further comprises instructions that, when executed by the computing system, cause the computing system to:
collect user action data, content session data, and notification settings data to provide more suitable search results based on searching through the search bar.

\* \* \* \* \*